(12) United States Patent
Wang et al.

(10) Patent No.: US 11,650,431 B2
(45) Date of Patent: May 16, 2023

(54) LOUDSPEAKER

(71) Applicant: SHENZHEN SHOKZ CO., LTD., Guangdong (CN)

(72) Inventors: Yueqiang Wang, Shenzhen (CN); Haofeng Zhang, Shenzhen (CN); Lei Zhang, Shenzhen (CN); Yongjian Li, Shenzhen (CN); Qian Chen, Shenzhen (CN)

(73) Assignee: SHENZHEN SHOKZ CO., LTD., Shenzhen (CN)

( * ) Notice: Subject to any disclaimer, the term of this patent is extended or adjusted under 35 U.S.C. 154(b) by 304 days.

(21) Appl. No.: 17/170,979

(22) Filed: Feb. 9, 2021

(65) Prior Publication Data

US 2021/0211790 A1 Jul. 8, 2021

Related U.S. Application Data

(63) Continuation of application No. PCT/CN2019/102377, filed on Aug. 24, 2019.

(30) Foreign Application Priority Data

Aug. 24, 2018 (CN) .......................... 201810975515.1
Aug. 24, 2018 (WO) ................ PCT/CN2018/102360

(51) Int. Cl.
*G02C 5/22* (2006.01)
*G02C 11/00* (2006.01)
(Continued)

(52) U.S. Cl.
CPC ........... *G02C 5/2254* (2013.01); *G02C 5/001* (2013.01); *G02C 5/143* (2013.01); *G02C 5/16* (2013.01);
(Continued)

(58) Field of Classification Search
CPC ...... G02C 5/2254; G02C 5/001; G02C 5/143; G02C 5/16; G02C 5/2227; G02C 11/10;
(Continued)

(56) References Cited

U.S. PATENT DOCUMENTS 4,902,120 A * 2/1990 Weyer .................... G02C 11/10
351/158
7,289,767 B2 10/2007 Lai
(Continued)

FOREIGN PATENT DOCUMENTS

CN 2639920 Y 9/2004
CN 102141688 A 8/2011
(Continued)

OTHER PUBLICATIONS

International Search Report in PCT/CN2019/102394 dated Nov. 28, 2019, 8 pages.
(Continued)

*Primary Examiner* — Sean H Nguyen
(74) *Attorney, Agent, or Firm* — Metis IP LLC

(57) ABSTRACT

The present disclosure relates to a loudspeaker. The loudspeaker may include a loudspeaker mechanism, a fixing mechanism, and a connector. The loudspeaker mechanism may be configured to generate a vibration signal and transmit the vibration signal to the human body. The fixing mechanism may be configured to support and maintain the position of the loudspeaker mechanism. The connector may be configured to connect the loudspeaker mechanism with the fixing mechanism. The loudspeaker mechanism may at least include a first fixed position and a second fixed position. The first fixed position may be a fixed position of the loudspeaker when the loudspeaker is in a non-working state. The second fixed position may be a fixed position of the loudspeaker when the loudspeaker is in a working state.

(Continued)

The connector may be configured to switch the loudspeaker mechanism between the first fixed position and the second fixed position.

20 Claims, 19 Drawing Sheets

(51) Int. Cl.
| | |
|---|---|
| *H04R 1/02* | (2006.01) |
| *G02C 5/14* | (2006.01) |
| *G02C 5/16* | (2006.01) |
| *H04R 1/10* | (2006.01) |
| *H04R 9/02* | (2006.01) |
| *H04R 9/04* | (2006.01) |
| *H04R 9/06* | (2006.01) |
| *G02C 5/00* | (2006.01) |
| *H04R 5/033* | (2006.01) |

(52) U.S. Cl.
CPC ............ *G02C 5/2227* (2013.01); *G02C 11/10* (2013.01); *H04R 1/025* (2013.01); *H04R 1/028* (2013.01); *H04R 1/1008* (2013.01); *H04R 1/1066* (2013.01); *H04R 5/0335* (2013.01); *H04R 9/025* (2013.01); *H04R 9/045* (2013.01); *H04R 9/06* (2013.01); *H04R 2400/03* (2013.01); *H04R 2460/13* (2013.01); *H04R 2499/10* (2013.01)

(58) Field of Classification Search
CPC ...... H04R 1/025; H04R 1/028; H04R 1/1008; H04R 1/066; H04R 5/0335; H04R 9/025; H04R 9/045; H04R 9/06; H04R 2400/03; H04R 2460/13; H04R 2499/10
USPC ......................................................... 381/386
See application file for complete search history.

(56) References Cited

U.S. PATENT DOCUMENTS

| | | | | |
|---|---|---|---|---|
| 2006/0034478 | A1* | 2/2006 | Davenport ............. | G02C 11/10 381/381 |
| 2006/0203183 | A1* | 9/2006 | Jannard ................ | H04R 1/1066 351/41 |
| 2008/0013041 | A1 | 1/2008 | Chou | |
| 2010/0238396 | A1* | 9/2010 | Jannard .................. | H04M 1/05 381/381 |
| 2011/0200204 | A1 | 8/2011 | Horigome et al. | |
| 2014/0253867 | A1* | 9/2014 | Jiang ...................... | G02C 11/10 351/158 |
| 2015/0257662 | A1 | 9/2015 | Lee et al. | |
| 2016/0234613 | A1 | 8/2016 | Westerkull | |
| 2016/0246076 | A1 | 8/2016 | Wei | |
| 2017/0090201 | A1 | 3/2017 | Guo | |
| 2020/0336824 | A1 | 10/2020 | Zheng et al. | |
| 2020/0344542 | A1 | 10/2020 | Liu et al. | |

FOREIGN PATENT DOCUMENTS

| | | |
|---|---|---|
| CN | 201984240 U | 9/2011 |
| CN | 202364340 U | 8/2012 |
| CN | 203786416 U | 8/2014 |
| CN | 204374548 U | 6/2015 |
| CN | 105007551 A | 10/2015 |
| CN | 204887455 U | 12/2015 |
| CN | 205103503 U | 3/2016 |
| CN | 205301727 U | 6/2016 |
| CN | 205720956 U | 11/2016 |
| CN | 205793159 U | 12/2016 |
| CN | 205961389 U | 2/2017 |
| CN | 206061075 U | 3/2017 |
| CN | 106937221 A | 7/2017 |
| CN | 106954150 A | 7/2017 |
| CN | 106954151 A | 7/2017 |
| CN | 106954153 A | 7/2017 |
| CN | 106974645 A | 7/2017 |
| CN | 206365029 U | 7/2017 |
| CN | 106997107 A | 8/2017 |
| CN | 206387972 U | 8/2017 |
| CN | 206421112 U | 8/2017 |
| CN | 206640748 U | 11/2017 |
| CN | 206920741 U | 1/2018 |
| CN | 107948881 A | 4/2018 |
| CN | 207424414 U | 5/2018 |
| CN | 207443120 U | 6/2018 |
| CN | 108391188 A | 8/2018 |
| CN | 207718105 U | 8/2018 |
| CN | 207720370 U | 8/2018 |
| CN | 108600920 A | 9/2018 |
| CN | 108776393 A | 11/2018 |
| CN | 108845436 A | 11/2018 |
| CN | 108873372 A | 11/2018 |
| CN | 109061902 A | 12/2018 |
| CN | 109495809 A | 3/2019 |
| CN | 208780924 U | 4/2019 |
| CN | 208780925 U | 4/2019 |
| CN | 208780932 U | 4/2019 |
| CN | 208847977 U | 5/2019 |
| CN | 208847981 U | 5/2019 |
| CN | 110022516 A | 7/2019 |
| CN | 209184747 U | 7/2019 |
| CN | 209267805 U | 8/2019 |
| JP | S59161928 A | 9/1984 |
| JP | 2006157318 A | 6/2006 |
| WO | 9623373 A1 | 8/1996 |
| WO | 2006023341 A2 | 3/2006 |
| WO | 2007070508 A2 | 6/2007 |
| WO | 2007133055 A1 | 11/2007 |
| WO | 2015115693 A1 | 8/2015 |

OTHER PUBLICATIONS

International Search Report in PCT/CN2019/102377 dated Dec. 3, 2019, 8 pages.
International Search Report in PCT/CN2019/102378 dated Nov. 6, 2019, 7 pages.
International Search Report in PCT/CN2019/102385 dated Nov. 18, 2019, 6 pages.
International Search Report in PCT/CN2019/102389 dated Nov. 28, 2019, 8 pages.
International Search Report in PCT/CN2019/102396 dated Nov. 27, 2019, 8 pages.
International Search Report in PCT/CN2019/102395 dated Nov. 27, 2019, 9 pages.
International Search Report in PCT/CN2019/102406 dated Nov. 26, 2019, 7 pages.
International Search Report in PCT/CN2019/102407 dated Nov. 8, 2019, 6 pages.
International Search Report in PCT/CN2019/102408 dated Nov. 6, 2019, 6 pages.
International Search Report in PCT/CN2019/102398 dated Oct. 31, 2019, 6 pages.
International Search Report in PCT/CN2019/102386 dated Nov. 25, 2019, 7 pages.
International Search Report in PCT/CN2019/102390 dated Nov. 22, 2019, 8 pages.
International Search Report in PCT/CN2019/102391 dated Nov. 22, 2019, 8 pages.
Written Opinion in PCT/CN2019/102391 dated Nov. 22, 2019, 12 pages.
Written Opinion in PCT/CN2019/102390 dated Nov. 22, 2019, 10 pages.
Written Opinion in PCT/CN2019/102396 dated Nov. 27, 2019, 10 pages.
Written Opinion in PCT/CN2019/102377 dated Dec. 3, 2019, 9 pages.

(56) References Cited

OTHER PUBLICATIONS

Written Opinion in PCT/CN2019/102378 dated Nov. 6, 2019, 13 pages.
Written Opinion in PCT/CN2019/102385 dated Nov. 18, 2019, 11 pages.
Written Opinion in PCT/CN2019/102389 dated Nov. 28, 2019, 9 pages.
Written Opinion in PCT/CN2019/102395 dated Nov. 27, 2019, 10 pages.
Written Opinion in PCT/CN2019/102394 dated Nov. 28, 2019, 9 pages.
Written Opinion in PCT/CN2019/102406 dated Nov. 26, 2019, 12 pages.
Written Opinion in PCT/CN2019/102407 dated Nov. 8, 2019, 10 pages.
Written Opinion in PCT/CN2019/102408 dated Nov. 6, 2019, 12 pages.
Written Opinion in PCT/CN2019/102398 dated Oct. 31, 2019, 9 pages.
Written Opinion in PCT/CN2019/102386 dated Nov. 25, 2019, 12 pages.

* cited by examiner

LOUDSPEAKER

CROSS REFERENCE TO RELATED APPLICATIONS

This application is a Continuation of International Application No. PCT/CN2019/102377 filed on Aug. 24, 2019, which claims priority of International Application No. PCT/CN2018/102360 filed on Aug. 24, 2018 and Chinese Patent Application No. 201810975515.1 filed on Aug. 24, 2018, the entire contents of each of which are incorporated herein by reference.

TECHNICAL FIELD

The present disclosure relates to a structure of an electronic product, in particular to a structure of a loudspeaker.

BACKGROUND

At present, loudspeakers such as earphones, MP3, etc., have become necessities of public life. With the development of related products, users not only have strict requirements for product functions, but are also particularly picky about the feeling when wearing the products. To satisfy the needs of different scenarios, the loudspeaker may be worn in a variety of ways. For example, the earphones may be close to a human ear through an ear hook. The present disclosure provides a headphone structure that can not only satisfy the specific wearing requirements of users, but also does not affect the wiring and sound quality of the products.

SUMMARY

The present disclosure relates to a loudspeaker. The loudspeaker may include a loudspeaker mechanism, a fixing mechanism, and a connector. The loudspeaker mechanism may be configured to generate a vibration signal and transmit the vibration signal to the human body. The fixing mechanism may be configured to support and maintain the position of the loudspeaker mechanism. The connector may be configured to connect the loudspeaker mechanism with the fixing mechanism. The loudspeaker mechanism may at least include a first fixed position and a second fixed position. The first fixed position may be a fixed position of the loudspeaker when the loudspeaker is in a non-working state. The second fixed position may be a fixed position of the loudspeaker when the loudspeaker is in a working state. The connector may be configured to switch the loudspeaker mechanism between the first fixed position and the second fixed position.

According to some embodiments of the present disclosure, the loudspeaker mechanism may include an attachment surface in contact with the human body. When the loudspeaker mechanism is in the second fixed position, the loudspeaker mechanism may press the attachment surface against a predetermined area on back of an auricle with a certain pressure to transmit the vibration signal to the human body.

According to some embodiments of the present disclosure, the connector may include a hinge configured to realize the switching of the loudspeaker mechanism between the first fixed position and the second fixed position. The hinge may include a hinge base and a hinge arm. The hinge arm may be rotatably connected with the hinge base. The hinge arm may at least include a first supporting surface and a second supporting surface. The hinge base may include a third supporting surface. The first supporting surface and the second supporting surface may respectively abut against the third supporting surface to realize the switching between the first fixed position and the second fixed position.

According to some embodiments of the present disclosure, the connector may be an elastic structure and provide a pressure to press the attachment surface against the back of the auricle when the loudspeaker mechanism is in the second fixed position.

According to some embodiments of the present disclosure, the connector may include a hydraulic transmission device. An external force may be provided by the hydraulic transmission device to switch the loudspeaker mechanism between the first fixed position and the second fixed position.

According to some embodiments of the present disclosure, the hydraulic transmission device may provide a pressure when the loudspeaker mechanism is in the second fixed position.

According to some embodiments of the present disclosure, the connector may further include a pressure feedback device configured to obtain the pressure. The connector may include a pressure adjusting device configured to adjust a contact pressure between the loudspeaker mechanism and the human body according to the pressure obtained by the pressure feedback device.

According to some embodiments of the present disclosure, the fixing mechanism may include a glasses frame, a hat, a headwear, a hearing aid, and/or other headwear products.

According to some embodiments of the present disclosure, the loudspeaker mechanism may include a magnetic circuit component, a vibration component, and a housing. The magnetic circuit component may be configured to provide a magnetic field. The vibration component may be configured to convert an electrical signal input to the vibration component into a mechanical vibration signal. At least a part of the vibration component may be arranged in the magnetic field. The housing may be configured to accommodate the magnetic circuit component and the vibration component.

According to some embodiments of the present disclosure, the vibration component may at least include a first vibration transmission component and a second vibration transmission component. The first vibration transmission component may be arranged above the second vibration transmission component. The first vibration transmission component and the second vibration transmission component may form a composite vibration structure stacked up and down to adjust a low-frequency resonance peak to move in a low-frequency direction and a high-frequency resonance peak to move in a high-frequency direction.

According to some embodiments of the present disclosure, the first vibration transmission component may have a certain elasticity relative to the second vibration transmission component. A thickness of the first vibration transmission component may be smaller than a thickness of the second vibration transmission component.

According to some embodiments of the present disclosure, the first vibration transmission component may include a first circular ring and at least two first supporting rods converging toward a center of the first circular ring. The second vibration transmission component may include a second circular ring and at least two second supporting rods converging toward a center of the second circular ring.

According to some embodiments of the present disclosure, the at least two first supporting rods and the at least two second supporting rods may be staggered.

According to some embodiments of the present disclosure, the thickness of the first vibration transmission component may be 0.1-0.2 mm. A width of a first supporting rod may be 0.5-1.0 mm. A thickness of the second vibration transmission component may be 0.8-1.2 mm. A width of the second supporting rod may be 1.6-2.6 mm.

According to some embodiments of the present disclosure, the first vibration transmission component may be made of stainless steel material.

According to some embodiments of the present disclosure, a coil may be fixed under the second vibration transmission component. At least a part of the coil may be arranged in a magnetic circuit system. The coil may receive the electrical signal. The electrical signal may be transformed into the mechanical vibration signal under an action of the magnetic field.

According to some embodiments of the present disclosure, the first vibration transmission component may be connected with the housing and transmit the vibration signal to the housing. An outer surface of the housing may include an attachment surface. The attachment surface may be an outer surface of the loudspeaker mechanism in contact with the human body. When the loudspeaker mechanism is in the second fixed position, the loudspeaker mechanism may press the attachment surface to the predetermined area on the back of the auricle to transmit the vibration signal to the human body.

Additional features will be set forth in part in the description which follows, and in part will become apparent to those skilled in the art upon examination of the following and the accompanying drawings or may be learned by production or operation of the examples. The features of the present disclosure may be realized and attained by practice or use of various aspects of the methodologies, instrumentalities, and combinations set forth in the detailed examples discussed below.

BRIEF DESCRIPTION OF THE DRAWINGS

The drawings described herein are used to provide a further understanding of the present disclosure and constitute a part of the present disclosure. The exemplary embodiments and the descriptions of the present disclosure may be for illustration only and not be intended to limit the scope of the present disclosure. In the drawings, the same reference numbers may represent the same structures.

DETAILED DESCRIPTION

Figure 1:
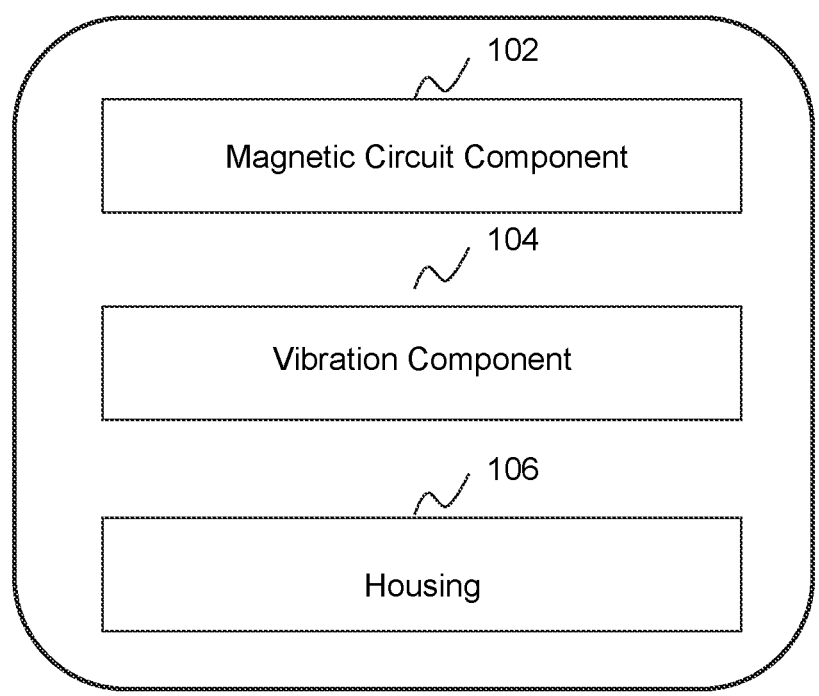
FIG. 1 is a block diagram illustrating a structure of a loudspeaker mechanism according to some embodiments of the present disclosure.

In order to illustrate the technical solutions related to the embodiments of the present disclosure, the drawings used to describe the embodiments are briefly introduced below. Obviously, drawings described below are only some examples or embodiments of the present disclosure. Those skilled in the art, without further creative efforts, may apply the present disclosure to other similar scenarios according to these drawings. It should be understood that the purposes of these illustrated embodiments are only provided to those skilled in the art to practice the application, and not intended to limit the scope of the present disclosure. Unless obviously obtained from the context or the context illustrates otherwise, the same numeral in the drawings refers to the same structure or operation.

As used in the disclosure and the appended claims, the singular forms "a," "an," and "the" may include plural referents unless the content clearly dictates otherwise. In general, the terms "comprise" and "include" merely prompt to include steps and elements that have been clearly identified, and these steps and elements do not constitute an exclusive listing. The methods or devices may also include other steps or elements. The term "based on" is "based at least in part on." The term "one embodiment" means "at least one embodiment;" the term "another embodiment" means "at least one other embodiment." Related definitions of other terms will be given in the description below. In the following, without loss of generality, the "loudspeaker" or "earphone" described in the present disclosure means "loudspeaker" or "earphone" with a loudspeaker component. For those skilled in the art, "loudspeaker" or "earphone" may also be replaced with other similar words, such as "player," "hearing aid," or the like. In fact, the various implementations in the present disclosure may be easily applied to hearing devices other than the loudspeaker. For those skilled in the art, after understanding the basic principles of loudspeaker, it may be possible to make various modifications and changes in the form and details of the specific methods and operations of implementing loudspeaker without departing from the principles. In particular, an environmental sound collection and processing function may be added to the loudspeaker to enable the loudspeaker to implement the function of a hearing aid. For example, a microphone may collect environmental sounds of a user/wearer, process the sounds using a certain algorithm and transmit the processed sound (or generated electrical signal) to a loudspeaker. That is, the loudspeaker may be modified to include the function of collecting the environmental sounds, and after a certain signal processing, the sound may be transmitted to the user/wearer via the loudspeaker, thereby implementing the function of the hearing aid.

The present disclosure discloses a loudspeaker. The loudspeaker may include a loudspeaker mechanism, a fixing mechanism, and a connector. In some embodiments, the loudspeaker mechanism may transmit sound to a user through bone conduction or air conduction. For example, when the sound is transmitted by the bone conduction, the loudspeaker mechanism may convert an electrical signal into a vibration signal and transmit the vibration signal to a human body through a human bone (e.g., a skull). As another example, when the sound is transmitted by the air conduction, the loudspeaker mechanism may convert the electrical signal into an air vibration, and sound generated by the air vibration may be transmitted to a human ear through an ear canal. In some embodiments, the fixing mechanism may be configured to support and maintain a position of the loudspeaker mechanism. For example, the fixing mechanism may include an ear hook, a glasses frame, a hat, headwear, or other headwear products, or the like, or any combination thereof. At least one loudspeaker mechanism may be arranged on the fixing mechanism and fixed at a preset position by the fixing mechanism, such that the sound generated by the loudspeaker mechanism can be stably transmitted to the human body. In some embodiments, the loudspeaker may further include a connector configured to connect the loudspeaker mechanism and the fixing mechanism. In some embodiments, the loudspeaker mechanism may realize a position change of the loudspeaker through the connector. For example, the adjustment of a position of the loudspeaker when the loudspeaker is in a working state and a position of the loudspeaker when the loudspeaker is in a non-working state. In some embodiments, the connector may enable the loudspeaker mechanism to be at a first fixed position or a second fixed position. When the loudspeaker mechanism is at different fixed positions, the efficiencies of the loudspeaker mechanism in transmitting sound to the human body may be different. For example, the first fixed position may be a fixed position of the loudspeaker when the loudspeaker is in the non-working state and the second fixed position may be a fixed position of the loudspeaker when the loudspeaker is in the working state. Compared with at the first fixed position, the loudspeaker may have a higher sound transmission efficiency at the second fixed position. Through the connector, the loudspeaker mechanism may be switched between the first fixed position and the second fixed position. More details regarding a specific structure of the fixing mechanism and the connector may refer to FIGS. 12-30 in the present disclosure.

The loudspeaker mechanism may receive an electrical signal from outside and convert the electrical signal into a sound signal. FIG. 1 is a block diagram illustrating a structure of a loudspeaker mechanism according to some embodiments of the present disclosure. As shown in FIG. 1, in some embodiments, a loudspeaker mechanism 20 may at least include a magnetic circuit component 102, a vibration component 104, and a housing 106 accommodating the magnetic circuit component 102 and the vibration component 104. The magnetic circuit component 102 may be configured to provide a magnetic field. The vibration component 104 may be configured to convert an electrical signal input to the vibration component 104 into a mechanical vibration signal.

In some embodiments, the magnetic field may be used to convert a signal containing sound information into a vibration signal. In some embodiments, the sound information may include a video or audio file with a specific data format, data, or files that may be converted into sound in a specific manner. The signal containing sound information may be obtained from a storage component of the loudspeaker or an external information generation, storage, or transmission system. The signal containing sound information may include an electrical signal, an optical signal, a magnetic signal, a mechanical signal, or the like, or any combination thereof. The signal containing sound information may be obtained from one signal source or a plurality of signal sources. The plurality of signal sources may be related or unrelated. In some embodiments, the loudspeaker may obtain a signal containing sound information in a variety of different ways. The acquisition of the signal may be wired or wireless, and may be real-time or delayed. For example, the loudspeaker may receive an electrical signal containing sound information in a wired or wireless manner or directly obtain data from a storage medium to generate a sound signal. As another example, the loudspeaker may include a component with a sound collection function, which picks up sounds in the environment, converts mechanical vibrations of the sounds into electrical signals, and then obtains electrical signals that meet specific requirements after processing the electrical signals by an amplifier.

Figure 2:
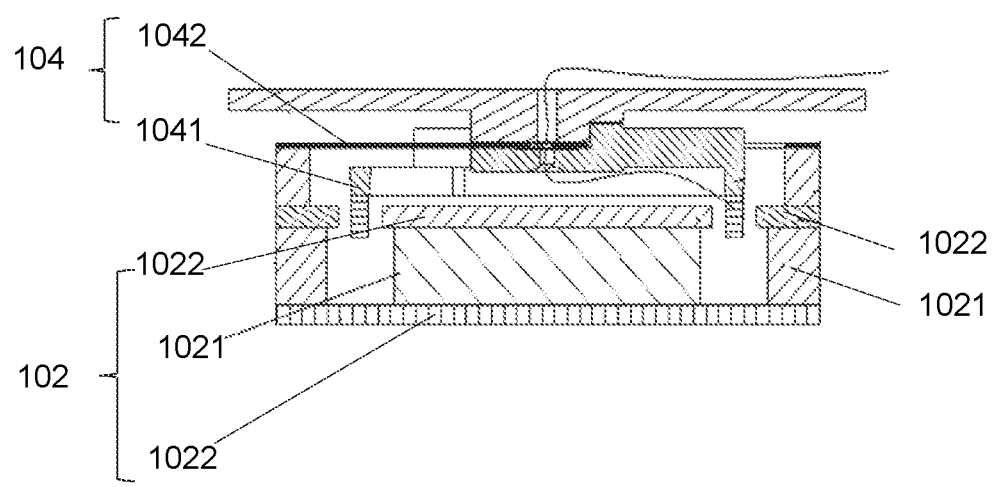
FIG. 2 is a schematic diagram illustrating an internal structure of a loudspeaker mechanism according to some embodiments of the present disclosure.

FIG. 2 is a schematic diagram illustrating an internal structure of a loudspeaker mechanism according to some embodiments of the present disclosure. As shown in FIG. 2, a magnetic circuit component 102 may include a magnetic element 1021 and a magnetic conductive element 1022. The magnetic element 1021 may refer to an element that generates a magnetic field, such as a magnet, etc. The magnetic element 1021 may have a magnetization direction. The magnetization direction may refer to a direction of the magnetic field inside the magnetic element 1021. The magnetic element 1021 may include one or more magnets. In some embodiments, the magnet may include a metal alloy magnet, a ferrite, etc. The metal alloy magnet may include neodymium iron boron, samarium cobalt, aluminum nickel cobalt, iron-chromium cobalt, aluminum iron boron, iron-carbon aluminum, or the like, or any combination thereof. The ferrite may include barium ferrite, steel ferrite, manganese ferrite, lithium manganese ferrite, or the like, or any combination thereof.

The magnetic conductive element 1022 may be distributed on the upper and lower sides and/or around the magnetic element 1021. In some embodiments, the magnetic conductive element 1022 may be an annular concave structure. In some embodiments, there may be more than one magnetic conductive element 1022, which may be arranged on the upper and lower surfaces of the magnetic element 1021, or the periphery and bottom of the magnetic element 1021. In some embodiments, there may be a magnetic gap between the magnetic element 1021 and the magnetic conductive element 1022. For example, the magnetic conductive element 1022 may surround a sidewall of the magnetic element 1021 and maintain a certain gap with the magnetic element 1021 to form the magnetic gap. In some embodiments, a magnetic conductor may adjust a distribution of a magnetic field (e.g., the magnetic field generated by the magnetic element 1021). The magnetic conductor may include an element processed from soft magnetic materials. In some embodiments, the soft magnetic materials may include metal materials, metal alloys, metal oxide materials, amorphous metal materials, etc., such as iron, iron-silicon alloys, iron-aluminum alloys, nickel-iron alloys, iron-cobalt Series alloy, low carbon steel, silicon steel sheet, silicon steel sheet, ferrite, etc. In some embodiments, the magnetic conductor may be processed by casting, plastic processing, cutting processing, powder metallurgy, or the like, or any combination thereof. The casting may include sand casting, investment casting, pressure casting, centrifugal casting, etc. The plastic processing may include rolling, casting, forging, stamping, extrusion, drawing, or the like, or a combination thereof. The cutting processing may include turning, milling, planning, grinding, etc. In some embodiments, a processing manner of the magnetic conductor may include 3D printing, a computer numerical control (CNC) machine tool, etc.

The vibration component 104 may generate a mechanical vibration. The generation of the mechanical vibration may be accompanied by a conversion of energy. The loudspeaker mechanism 20 may use the magnetic circuit component 102 and the vibration component 104 to convert the signal including sound information to the mechanical vibration. The conversion process may involve a coexistence and conversion of many different types of energy. For example, the electrical signal may be directly converted into the mechanical vibration through a transducer to generate sound. As another example, the sound information may be contained in an optical signal and a specific transducer device may realize a process of converting the optical signal into a vibration signal. Other types of energy that may be coexisted and converted during a working process of the transducer works may include thermal energy, magnetic field energy, etc. An energy conversion mode of the transducer may include a moving coil type, an electrostatic type, a piezoelectric type, a moving iron type, a pneumatic type, an electromagnetic type, etc. A frequency response range and sound quality of the loudspeaker mechanism 20 may be affected by the vibration component 104. For example, in a transducer with the moving coil type, the vibration component 104 may include a wound cylindrical coil and at least one vibration unit (e.g., a vibration plate). The cylindrical coil driven by a signal current may drive the vibration unit to vibrate and produce sound in a magnetic field. An expansion and contraction of the material of the vibration unit, a deformation, size, and shape of folds in the vibration unit, a fixing way of the vibration unit, and a magnetic density of a permanent magnet, etc., may have an impact on the sound quality of the loudspeaker mechanism 20. The vibration unit of the vibration component 104 may be a mirror-symmetric structure, a center-symmetric structure, or an asymmetric structure. The vibration unit may be disposed with an intermittent hole-like structure to make the vibration unit generate larger displacement under the same input energy, which may improve sensitivity of the loudspeaker and output power of vibration and sound. The vibration unit may be a ring or a ring-like structure. A plurality of supporting rods converging toward a center of the ring may be arranged in the ring. A number of the plurality of supporting rods may be two or more.

In some embodiments, the loudspeaker mechanism 20 may be an air conductive loudspeaker mechanism. The air conductive loudspeaker mechanism may receive an electrical signal and convert the electrical signal into a sound that is transmitted to the human ear through the air. In some embodiments, the loudspeaker mechanism 20 may be a bone conductive loudspeaker mechanism. The bone conductive loudspeaker mechanism may be used to receive the electrical signal and convert the electrical signal into a mechanical vibration signal. The human body may directly receive the mechanical vibration signal and transmit a sound wave through human bones, bone labyrinth, inner ear lymphatic fluid, spiral organs, auditory nerve, or auditory center. The aforementioned vibration component 104 may also convert the electrical signal into the mechanical vibration signal in the bone conductive loudspeaker mechanism. In some embodiments, the vibration component 104 may be a composite vibration structure to generate a plurality of resonance peaks to improve the sound quality of the bone conductive loudspeaker mechanism.

Figure 3:
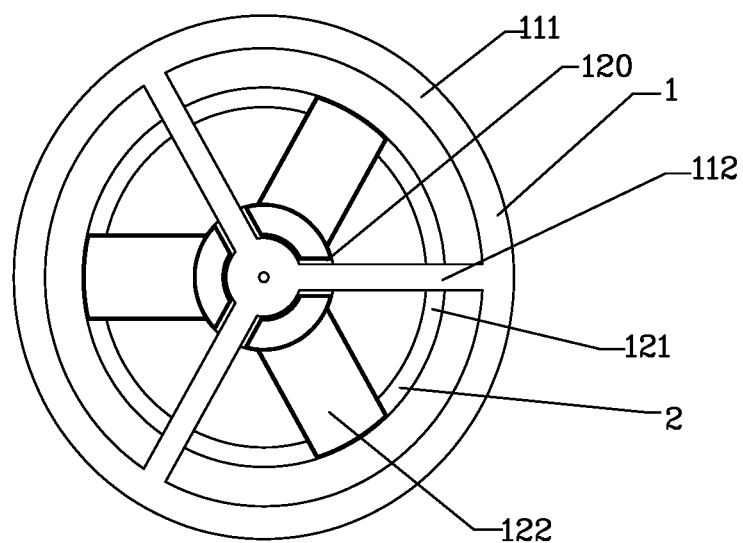
FIG. 3 is a schematic diagram illustrating a structure of a vibration component according to some embodiments of the present disclosure.

FIG. 3 is a schematic diagram illustrating a structure of a vibration component according to some embodiments of the present disclosure. As shown in FIG. 3, in some embodiments, the vibration component 104 may at least include a first vibration transmission component 1 and a second vibration transmission component 2. The first vibration transmission component 1 may be arranged above the second vibration transmission component 2. The first vibration transmission component 1 and the second vibration transmission component 2 may form a composite vibration structure stacked up and down to generate two resonance peaks.

In some embodiments, the first vibration transmission component 1 may include a first circular ring 111 and at least two first supporting rods 112 converging toward a center of the first circular ring 111. In some embodiments, the first vibration transmission component may include three first supporting rods 112. The three first supporting rods 112 may converge toward the center of the first circular ring. A convergence center may be fixed to the center of the second vibration transmission component. In some embodiments, the second vibration transmission component 2 may include a second circular ring 121 and at least two second supporting rods 122 converging toward a center of the second circular ring 121. In some embodiments, a center of the second vibration transmission component may include a groove 120. A shape of the groove 120 may match the three first supporting rods, so that the center of the first vibration transmission component may be embedded in the groove. The first vibration transmission component and the second vibration transmission component may be assembled together. In some embodiments, a radius of the second circular ring may be smaller than a radius of the first circular ring. In some embodiments, the second vibration transmission component may include three second supporting rods 122. A second supporting rod may be thicker than a first supporting rod. In some embodiments, the first supporting rod 112 and the second supporting rod 122 may be staggered during assembly. In some embodiments, a first supporting rod 112 and a second supporting rod 122 may be at a certain angle, such as 30 degrees, 60 degrees, etc., which may not be limited herein.

In some embodiments, a count of the first supporting rod 112 and a count of the second supporting rod 122 may not be limited. For example, when there are two first supporting rods 112, the two first supporting rods 112 may be arranged symmetrically or at a certain angle, for example, the two first supporting rods 112 may be arranged at 90 degrees. In some other embodiments, the first supporting rod 112/second supporting rod 122 may also be configured as four, five, or more spoke structures, which may not be limited herein.

It should be noted that the vibration component of the loudspeaker mechanism 20 may be configured as a structure including a plurality of vibration transmission components or a composite vibration structure formed by a combination of multiple groups of the first vibration transmission component 1 and the second vibration transmission component 2. The multiple groups of the first vibration transmission component 1 and the second vibration transmission component 2 may respectively correspond to different response frequency response ranges, such that the headphone vibration component with full-range, full-frequency response and high-quality audio may be realized. For example, the composite vibration structure may be a multi-layered vibration structure formed by a plurality of vibration transmission components, such as the first vibration transmission component, the second vibration transmission component, and the third vibration transmission component. The plurality of vibration transmission components may be made of different materials or have different radius and thicknesses. The more a count of vibration transmission components in the composite vibration structure, the more resonance peaks are obtained, which makes the frequency response curve more flatter and the sound wider.

In some embodiments, the first vibration transmitting component 1 may be an elastic component. An elasticity of the elastic component may be determined by the material, thickness, and structure of the first vibration transmitting component 1. In some embodiments, the material of the first vibration transmission component 1 may include, but is not limited to, steel (including but not limited to stainless steel, carbon steel, etc.), light-alloy (such as but not limited to aluminum alloy, beryllium copper, magnesium alloy, titanium alloys, etc.), plastics (such as but not limited to high molecular weight polyethylene, blown nylon, engineering plastics, etc.), or other single or composite materials that may achieve the same performance. The composite materials may include, for example, but not limited to, reinforcing materials such as glass fibers, carbon fibers, boron fibers, graphite fibers, graphene fibers, silicon carbide fibers or aramid fibers, or composites of other organic and/or inorganic materials, such as glass fibers reinforced unsaturated polyester, various types of glass fiber reinforced plastic composed of epoxy resin or phenolic resin matrix.

In some embodiments, the first vibration transmission component 1 may be made of stainless steel. When a thickness of the first vibration transmission component 1 is 0.1-0.2 mm and a width of each of three first supporting rods 112 of the first vibration transmission component 1 is 0.5-1.0 mm, a low-frequency resonance peak of the loudspeaker may be 300-900 Hz. When a width of each of second supporting rods 122 of the second vibration transmission component 2 is 1.6-2.6 mm and a thickness of the second vibration transmission component 2 is 0.8-1.2 mm, a high-frequency resonance peak of the loudspeaker may be 7500-9500 Hz. The structure of the first vibration transmission component 1 and the second vibration transmission component 2 may not be limited to a structure including three straight rods. As long as the vibration transmission component and the vibration plate have proper flexibility, cross rods, bending rods, or other rod-shaped structures are also suitable. In some embodiments, by changing the material and thickness of the first vibration transmission component 1 and the second vibration transmission component 2, and adjusting the width of the first/second supporting rod 122, low frequency or high frequency resonance peaks of the loudspeaker satisfying different conditions may be obtained. In some embodiments, a low frequency resonance peak of the loudspeaker may be 100-1000 Hz. In some embodiments, the low frequency resonance peak of the loudspeaker may be 100-900 Hz. In some embodiments, the low frequency resonance peak of the loudspeaker may be 200-800 Hz. In some embodiments, the low frequency resonance peak of the loudspeaker may be 300-800 Hz. In some embodiments, the low frequency resonance peak of the loudspeaker may be 400-700 Hz. In some embodiments, a high-frequency resonance peak of the loudspeaker may be 4000-10000 Hz. In some embodiments, the high-frequency resonance peak of the loudspeaker may be 4000-9500 Hz. In some embodiments, the high-frequency resonance peak of the loudspeaker may be 5000-9000 Hz. In some embodiments, the high-frequency resonance peak of the loudspeaker may be 5500-8000 Hz. In some embodiments, the high-frequency resonance peak of the loudspeaker may be 6000-7000 Hz. In some embodiments, a frequency difference between the low-frequency resonance peak and the high-frequency resonance peak of the loudspeaker may be not less than 5000 Hz. In some embodiments, the frequency difference may be not less than 6000 Hz. In some embodiments, the frequency difference may be not less than 7000 Hz. In some embodiments, the frequency difference may be not less than 8000 Hz. In some embodiments, the frequency difference may be not less than 10000 Hz. In some embodiments, the frequency difference may be not less than 12000 Hz.

Certainly, the more composite vibration structures, the more resonance peaks may be obtained, the attaching curve may be flatter, and the sound may be wider. Therefore, according to actual application scenarios, more than two components similar to the first vibration transmission component 1 and the second vibration transmission component 2 may be used for overlapping arrangement.

Figure 4:
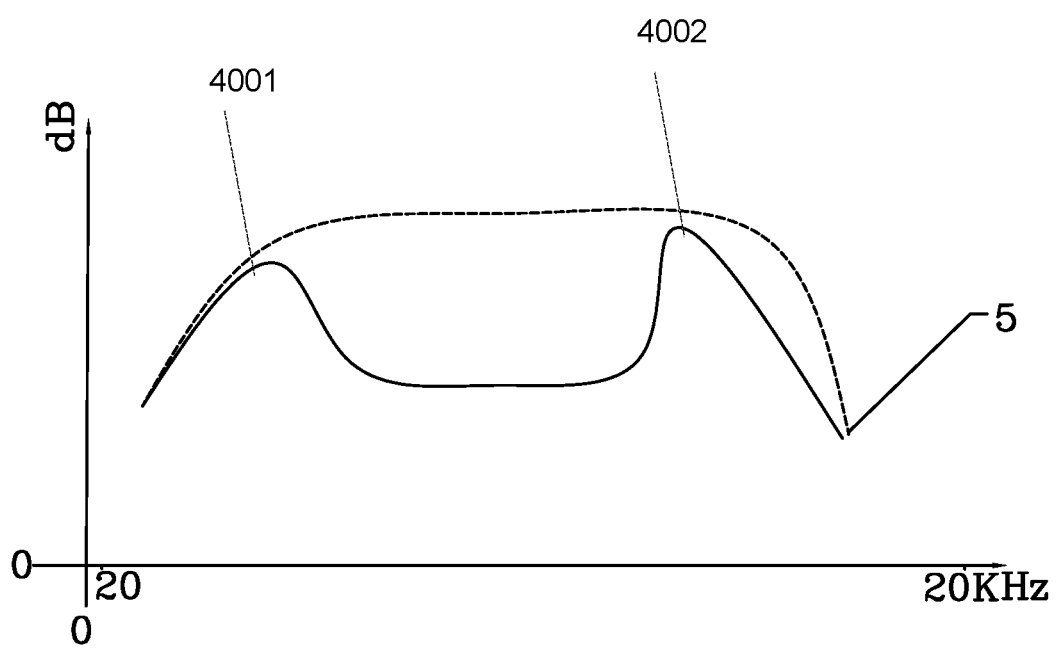
FIG. 4 is a schematic diagram illustrating a frequency response of a composite vibration device of a loudspeaker according to some embodiments of the present disclosure.

FIG. 4 is a schematic diagram illustrating a frequency response of a composite vibration structure of a loudspeaker according to some embodiments of the present disclosure. As shown in FIG. 4, the composite vibration structure composed of the first vibration transmission component 1 and the second vibration transmission component 2 may generate two resonance peaks including a resonance peak 4001 and a resonance peak 4002. A frequency response curve donated as a dashed line in FIG. 4 may be attached, which is a flat frequency response in an ideal state. A range of these resonance peaks may be within a frequency response range that the ear may hear, which broadens the resonant response range of the loudspeaker, and the ideal sound will be obtained. In some embodiments, positions of the resonance peaks may be changed by adjusting a size and/or material of the first vibration transmission component 1 and the second vibration transmission component 2. For example, the low frequency resonance peak may be located at a position with a lower frequency or the high frequency resonance peak may be located at a position with a higher frequency.

In some embodiments, the vibration component 104 may also include a coil. For example, the coil may be fixed under the second vibration transmission component 2. At least a part of the coil may be arranged in a magnetic circuit system. The coil may receive an electrical signal and convert the electrical signal into a mechanical vibration signal under the action of a magnetic field. In some embodiments, the first vibration transmission component 1 may be connected to the housing 106 and transmit the vibration signal to the housing 106.

In some embodiments, when the loudspeaker is a bone conductive loudspeaker, the housing 106 may transmit mechanical vibration to the human body, so that the human body may hear the sound. The housing 106 may constitute an accommodating space. The magnetic circuit component 102 and the vibration component 104 may be arranged inside the housing 106. In some embodiments, an inner wall of the housing 106 may be directly or indirectly connected to the vibration component 104. When a user wears the bone conductive loudspeaker, an outer wall of the housing 106 may contact the user and transmit the mechanical vibration of the vibration component 104 to an auditory nerve via the bones to make the human hear the sound.

In some embodiments, the outer surface of the housing 106 may have an attachment surface. The attachment surface may be an outer surface of the loudspeaker mechanism 20 contacting the human body when the user wears the loudspeaker. When the bone conductive loudspeaker presses the attachment surface to a preset area (the front of the tragus, the position of the skull, or the back of the auricle), the vibration signal may be effectively transmitted to the auditory nerve of the user through the bones, thereby improving the sound quality of the bone conductive loudspeaker.

Different from air conductive, bone conductive may use a solid or solid-liquid mixture as a medium to transmit sound/vibration, which has a significant impact on the sound quality of the bone conductive. Therefore, in some embodiments, an important manner to improve the sound quality of the bone conductive may include selecting a suitable transmission route of bone conductive, adjusting and controlling characteristics of the transmission route.

Figure 5:
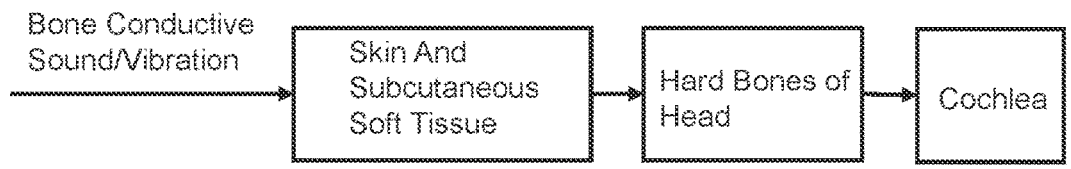
FIG. 5 is a schematic diagram illustrating a transmission route of a bone conductive sound/vibration according to some embodiments of the present disclosure.

For example, the bone conductive loudspeaker may be attached to a mastoid (e.g., a bone conductive hearing aid), a front end of a tragus (e.g., a bone conductive stereo headphone), other positions of the skull (e.g., bone conductive communication helmet), etc. According to the above transmission routes of bone conductive, the sound/vibration may be transmitted to hard bones after passing through the skin and subcutaneous soft tissues, and then to a cochlea to produce bone conductive hearing. More details regarding a specific transmission route may refer to FIG. 5. For example, a bone conductive earphone may be attached to the front end of an ear handle and a vibration signal generated by the bone conductive earphone may be transmitted to hard bones of a head through the skin and further transmitted to the cochlea, so that the human may hear the sound.

It should be noted that the auricle may be a part of an external ear of the human body and mainly composed of cartilage. In some embodiments, the attachment surface of the bone conductive loudspeaker may be attached to the back of the auricle and transmit bone conductive sound/vibration via cartilage of the auricle.

Figure 6:
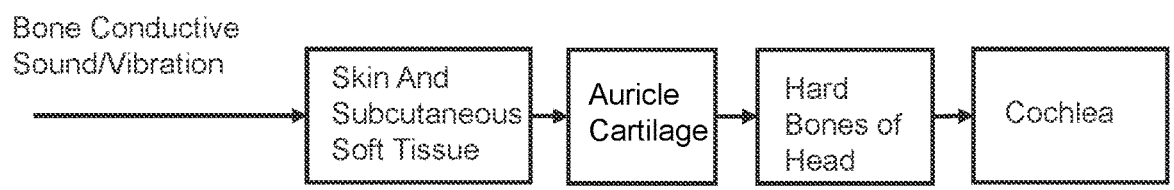
FIG. 6 is a schematic diagram illustrating another transmission route of a bone conductive sound/vibration according to some embodiments of the present disclosure.

In some embodiments, compared with hard bones, ear cartilage may have lower stiffness and have higher transmission efficiency of low-frequency sound/vibration, which may better transmit low-frequency and reduce the lack of low-frequency in the transmission process. Since the auricle is fan-shaped, in the process of transmitting the bone-conductive sound/vibration, the auricle itself and its connected tissues may also produce corresponding vibrations, so that air conductive sound may be produced. At the same time, in the ear canal, the vibration of a wall of the ear canal caused by the vibration of the auricle may make the air conductive sound in the ear canal to produce high-frequency resonance. The air conductive sound may further compensate for the lack of low-frequency of bone conductive sound/vibration in the transmission process and the lack of high-frequency caused by skin and subcutaneous soft tissue. Specifically, when the attachment surface of the bone conductive loudspeaker attaches to the auricle, the transmission route of the bone conductive sound/vibration may be shown in FIG. 6. Compared with the transmission route of other attaching parts (e.g., a transmission route shown in FIG. 5), a transmission link of the auricle cartilage is added to the transmission route.

Figure 7:
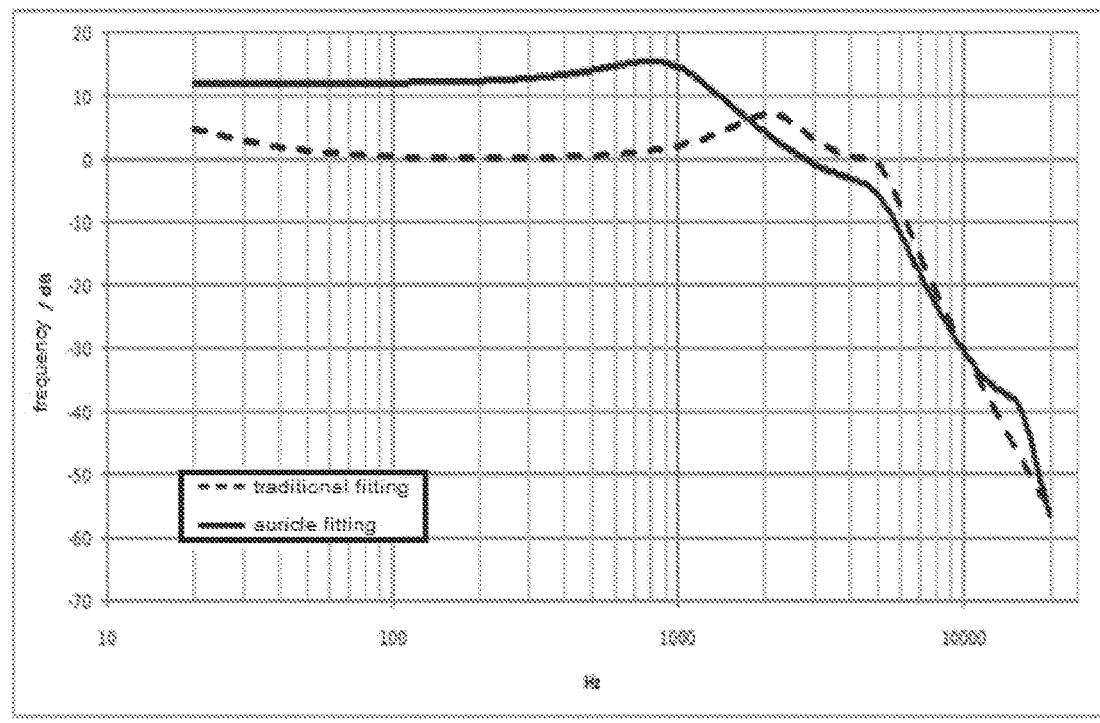
FIG. 7 is a schematic diagram illustrating an amplitude-frequency curve of transmission of sound/vibration in a loudspeaker with a traditional attaching manner and an amplitude-frequency curve of transmission of sound/vibration in a loudspeaker with an auricle attaching manner according to some embodiments of the present disclosure.

In addition, please further refer to FIG. 7. FIG. 7 is a schematic diagram illustrating an amplitude-frequency curve of transmission of sound/vibration in a loudspeaker with a traditional attaching manner and an amplitude-frequency curve of transmission of sound/vibration in a loudspeaker with an auricle attaching manner according to some embodiments of the present disclosure. FIG. 7 shows frequency domain characteristics of the transmission route of the loudspeaker mechanism (e.g., the loudspeaker mechanism 20) with the auricle attaching manner and the loudspeaker mechanism with the traditional attaching manner (e.g., attaching in front of the auricle), which are calculated using mathematical calculations. Compared with traditional attaching solution, due to the addition of the transmission link of the auricle cartilage in the transmission route, middle and low frequencies in an amplitude-frequency curve of the transmission route may be significantly improved, which indicates that the attaching of the attachment surface of the loudspeaker mechanism 20 and the back of the user's auricle can reduce the loss of the low-frequency in the transmission process.

Further, the attaching of the loudspeaker mechanism 20 and the back of the auricle may improve the sound quality while reducing the impact on the ear canal during sound transmission. At the same time, since the attachment surface of the loudspeaker mechanism 20 is attached to the back of the auricle, the loudspeaker mechanism 20 may be hidden behind the ear without appearing to satisfy the different needs of users.

Figure 8:
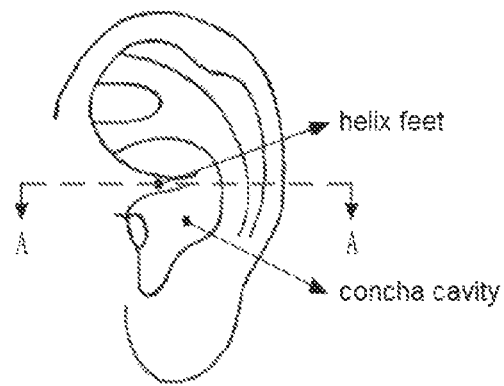
FIG. 8 is a schematic diagram illustrating a structure of a human ear.
Figure 9:
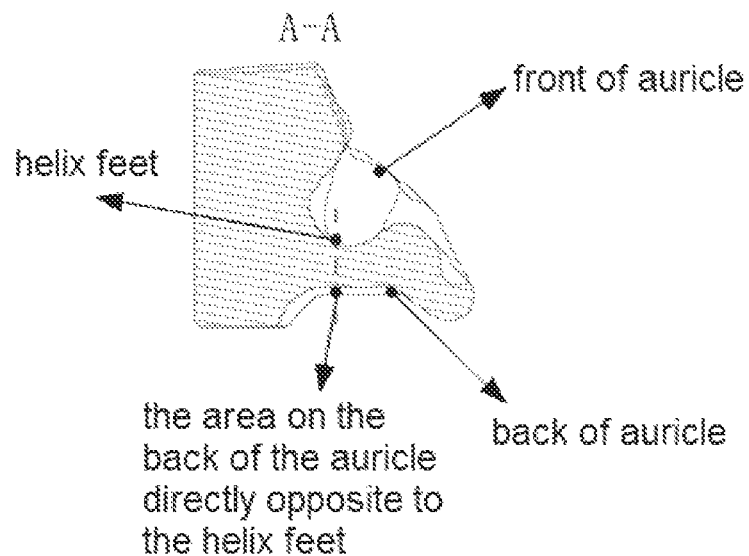
FIG. 9 is a sectional view of an ear along an axis A-A in FIG. 8.

In some embodiments, a fixing mechanism may act on the loudspeaker mechanism 20, so that the attachment surface of the loudspeaker mechanism 20 may attach a predetermined area on the back of the user's auricle, thereby improving the user's wearing experience. Further, since an area of the back of the auricle directly opposite a helix feet is relatively flat, it is suitable for the loudspeaker mechanism 20 to attach on a larger area to obtain higher vibration transmission efficiency and greater volume. Besides, a cartilage layer in the area is thick and clos to the inner ear canal, and has a good flexibility, which may avoid vibration, numbness, and other discomfort caused by vibration through an edge of the auricle while obtaining a good sound quality. Therefore, the area on the back of the auricle directly opposite the helix feet may be used as the predetermined area. More details may refer to FIG. 8 and FIG. 9. In some embodiments, the predetermined area may be a certain range of area on the back of the auricle directly opposite the helix feet, such as 5 $cm^2$, 10 $cm^2$, 20 $cm^2$, 30 $cm^2$, etc.

In some embodiments, the loudspeaker mechanism may be arranged on the fixing mechanism. The loudspeaker mechanism may be fixed at a preset position by the fixing mechanism, for example, the area on the back of the auricle. In some embodiments, a connector may be disposed between the loudspeaker mechanism and the fixing mechanism. Through the connector, the loudspeaker mechanism may have a plurality of position states relative to the fixing mechanism to realize the adjustment and transformation of the position of the loudspeaker mechanism. In some embodiments, a hinge may be arranged on the connector. The adjustment and transformation of different positions of the loudspeaker mechanism may be achieved through the hinge. In some embodiments, the hinge may include a hinge base and a hinge arm. The hinge arm may be rotatably connected to the hinge base. When the hinge arm rotates at different angles relative to the hinge base, the loudspeaker mechanism may be in different positions.

In some embodiments, the fixing mechanism may include a glasses frame, a hat, a headwear, or other headwear products, or the like, or any combination thereof. For example, there may be two loudspeaker mechanisms that may be respectively arranged at both ends of a glasses temple. As another example, the loudspeaker mechanism may be arranged on the hat and arranged at a position on the hat corresponding to the back of the auricle. In the following, taking the fixing mechanism as a glasses frame as an example, a structure of each component of the loudspeaker such as the fixing mechanism and the connector may be described in detail. In some embodiments, the glasses frame may be a glasses frame of any one of various glasses such as near-sighted glasses, far-sighted glasses, sunglasses, 3D glasses, etc., which may not be specifically limited herein.

Figure 10:
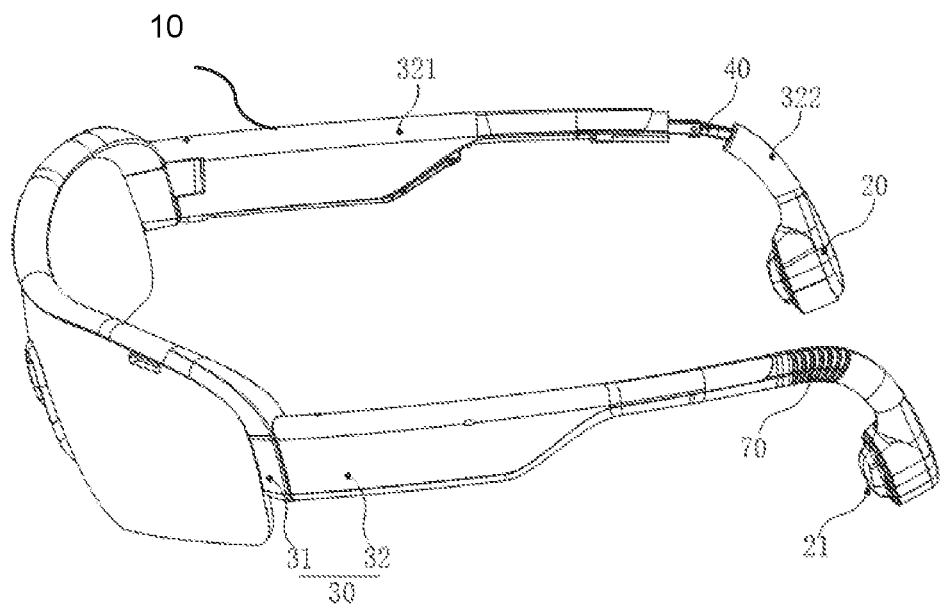
FIG. 10 is a schematic diagram illustrating a structure of a loudspeaker according to some embodiments of the present disclosure.

FIG. 10 is a schematic diagram illustrating a structure of a loudspeaker according to some embodiments of the present disclosure. As shown in FIG. 10, the loudspeaker may include the loudspeaker mechanism 20, a connector 322, a hinge 40, and a fixing mechanism 10. The fixing mechanism 10 may be a glasses frame.

The glasses frame 30 may include a glasses frame 31 and a glasses temple 32. The glasses temple 32 may include a glasses temple body 321 connected to the glasses frame 31 and a connector 322 connected to an end of the glasses temple body 321 away from the glasses frame 31. In some embodiments, the loudspeaker mechanism 20 may be arranged on the connector 322.

Figure 11:
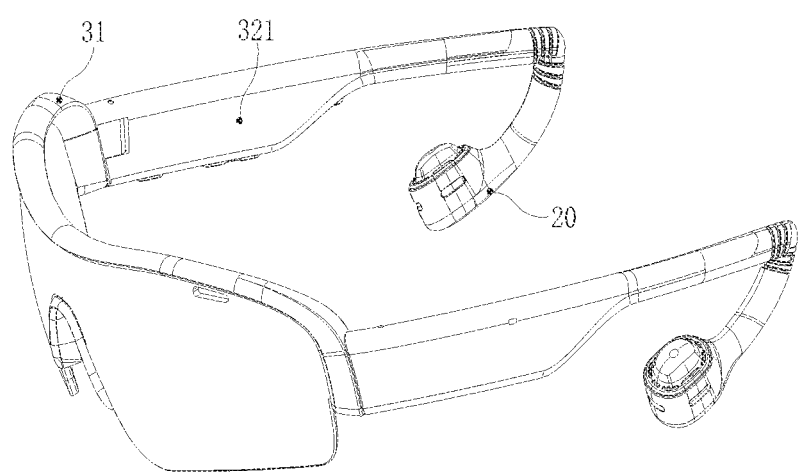
FIG. 11 is a schematic diagram illustrating a structure of a loudspeaker according to some embodiments of the present disclosure.

In some embodiments, the connector 322 may be configured to connect the loudspeaker mechanism 20 with the fixing mechanism 10. The connector 322 may make the loudspeaker mechanism 20 be arranged at a first fixed position or a second fixed position. When the user wears the loudspeaker, the first fixed position may be a fixed position of the loudspeaker mechanism 20 when the loudspeaker mechanism 20 is away from a human body (as shown in FIG. 10). The second fixed position may be a fixed position of the loudspeaker mechanism 20 when the loudspeaker mechanism 20 is closed to the human body (as shown in FIG. 11). The connector 322 may make the loudspeaker mechanism 20 to switch between the first fixed position and the second fixed position.

In some embodiments, when the loudspeaker mechanism 20 is arranged at the first fixed position, it may also be considered that the loudspeaker is in a non-working state. When the loudspeaker is in the non-working state, the user wears glasses, but does not use the function (such as listening to music) of the loudspeaker of the glasses, or the user does not wear glasses. In some embodiments, when the loudspeaker mechanism 20 is arranged at the second fixed position, it may also be considered that the loudspeaker is in a working state. When the loudspeaker is in the working state, the user wears glasses and attaches the loudspeaker mechanism 20 to a predetermined area of the human body to keep the loudspeaker in contact with the human body.

In some embodiments, when the loudspeaker mechanism 20 is arranged at the second fixed position, the loudspeaker mechanism 20 may attach on the back of the user's auricle. Specifically, the loudspeaker mechanism 20 may have an attachment surface 21 that is in contact with the human body. When the connector 322 is in the second fixed position, the loudspeaker mechanism 20 may press the attachment surface 21 against the predetermined area of the back of the auricle with a certain pressure, thereby effectively transmitting the vibration signal to the human body.

In some embodiments, at least part of the attachment surface 21 may be a curved surface. For example, the curved surface may include an arc surface convex toward the back of the auricle, which enables the loudspeaker mechanism 20 to attach well with the back of the auricle with irregular shapes. Specifically, the attachment surface 21 may also include a convex arc surface with a curvature not greater than 1, so that the loudspeaker mechanism 20 may fully contact the back of the auricle, thereby improving the efficiency of sound/vibration transmission of the loudspeaker mechanism 20 through the back of the auricle.

Figure 12:
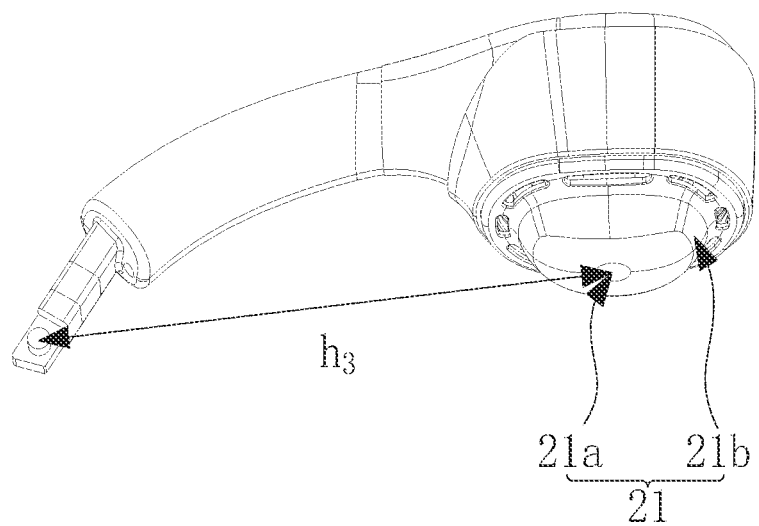
FIG. 12 is a schematic diagram illustrating a structure of a loudspeaker mechanism according to some embodiments of the present disclosure.

FIG. 12 is a schematic diagram illustrating a structure of a loudspeaker mechanism according to some embodiments of the present disclosure. In some embodiments, the attachment surface 21 may include a flat surface 21a arranged in the middle and a curved surface 21b extending in a circumferential direction of the flat surface 21a. The flat surface 21a and the curved surface 21b may jointly form an arc surface convex toward the back of the auricle. In some embodiments, an area of the attachment surface 21 may not be less than 0.5 $cm^2$ or 1 $cm^2$. Since the area of the attachment surface 21 in the embodiments is large enough, a contact area between the loudspeaker mechanism 20 and the back of the auricle may be large enough, on the one hand, which may reduce a pressure applied by the attachment surface 21 of the loudspeaker mechanism 20 on the back of the user's auricle and the user's wearing burden, and improve the user's comfort when wearing the loudspeaker, on the other hand, which may improve the efficiency of sound/vibration transmission and make the sound volume large enough to satisfy the needs of the user.

In some embodiments, when the loudspeaker mechanism 20 is in one fixed position, the loudspeaker mechanism 20 may be switched to another fixed position by applying a predetermined magnitude of force to the connector 322. It is necessary to apply the force exceeding the predetermined magnitude to the connector 322 to be able to change the fixed position of the loudspeaker mechanism 20, which may prevent the loudspeaker mechanism 20 from automatically changing the position of the loudspeaker mechanism 20 due to its gravity. Therefore, on the one hand, the user can accurately locate the position of the loudspeaker mechanism 20, on the other hand, the bad user experience caused by the vibration of the loudspeaker mechanism 20 can be reduced.

In some embodiments, the loudspeaker mechanism 20 may include a first fixed position and a second fixed position relative to the glasses temple body 321. The loudspeaker mechanism 20 may not include an intermediate transition position between the first fixed position and the second fixed position. For example, when the loudspeaker mechanism 20 is arranged at the first fixed position relative to the glasses temple body 321, the glasses may be used as normal glasses (e.g., glasses without a function of the loudspeaker). At this time, the user may manually apply the force exceeding the predetermined magnitude to the connector 322 to adjust the position of the connector 322. The connector 322 and the loudspeaker mechanism 20 may be folded relative to the glasses temple body 321, so that the loudspeaker mechanism 20 may be at the second fixed position relative to the glasses temple body 321 to make the attachment surface 21 of the loudspeaker mechanism 20 attach the back of the user's auricle. Therefore, the user may use the function of the loudspeaker of the glasses at the same time and other positions between the first fixed position and the second fixed position may not appear.

Certainly, in other embodiments, in addition to the abovementioned the first fixed position and the second fixed position, the loudspeaker mechanism 20 may also include one or more other fixed positions relative to the glasses temple body 321 to satisfy different requirements of the user. For example, the loudspeaker mechanism 20 may also include a third fixed position. When the user is not wearing glasses, the loudspeaker mechanism 20 may be adjusted to the third fixed position, and then stored in a glasses case or a glasses bag, which is more convenient to carry.

In some embodiments, the connector 322 may include a hinge 40. The hinge 40 may be configured to realize the switch of the loudspeaker mechanism 20 between the first fixed position and the second fixed position. In some embodiments, the hinge may include a hinge base and a hinge arm. The hinge arm may at least include a first supporting surface and a second supporting surface. The hinge base may include a third supporting surface. The first supporting surface and the second supporting surface may respectively abut against the third supporting surface to realize the switch between the first fixed position and the second fixed position. Specifically, the connector 322 may be hinged with an end of the glasses temple body 321 away from the glasses frame 31 through the hinge 40.

Figure 13:
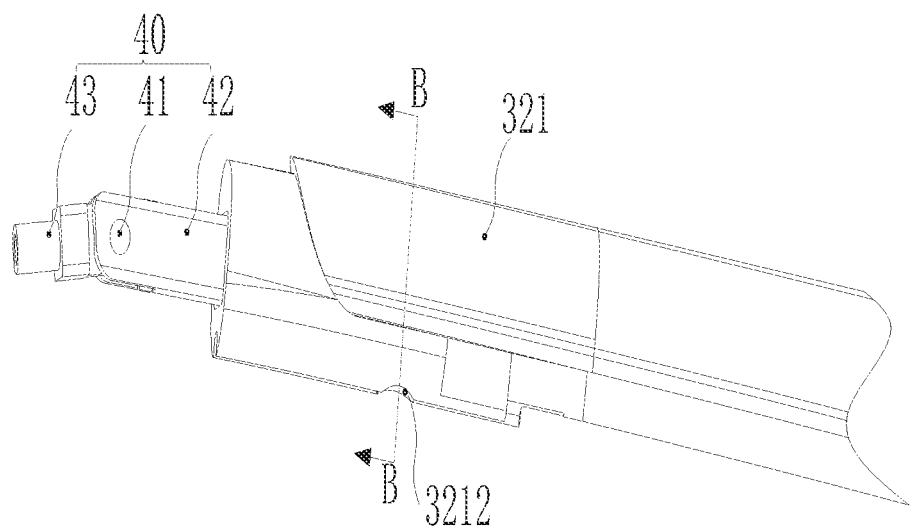
FIG. 13 is a schematic diagram illustrating a partial structure of a loudspeaker according to some embodiments of the present disclosure.
Figure 14:
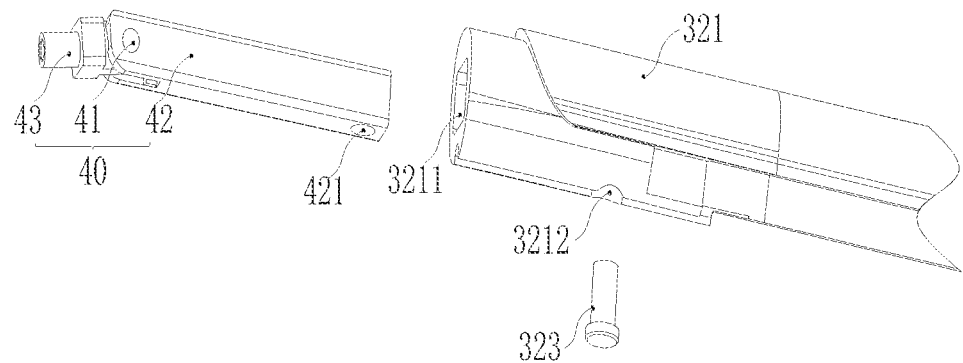
FIG. 14 is an exploded view illustrating a partial structure of a loudspeaker according to some embodiments of the present disclosure.
Figure 21:
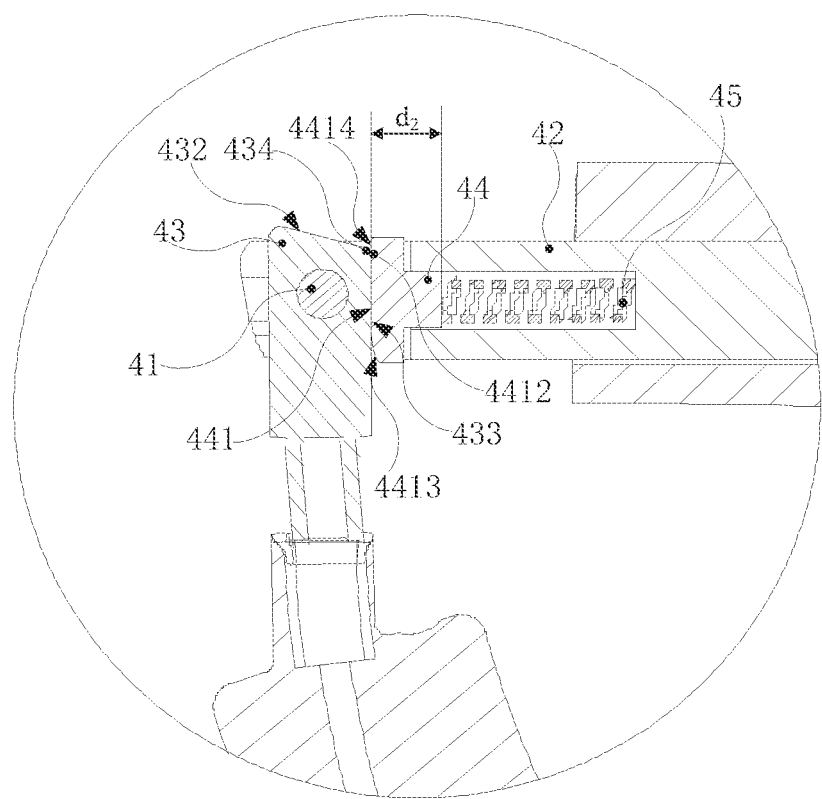
FIG. 21 is an enlarged view of a part C in FIG. 20.

FIG. 13 is a schematic diagram illustrating a partial structure of a loudspeaker according to some embodiments of the present disclosure. FIG. 14 is an exploded view illustrating a partial structure of a loudspeaker according to some embodiments of the present disclosure. As shown in FIGS. 13-14, in some embodiments, the hinge 40 may include a hinge base 42 and a hinge arm 43. The hinge arm 43 may be rotatably connected with the hinge base 42 through a shaft 41. As shown in FIG. 21, in some embodiments, the hinge arm 43 may include at least a first supporting surface 432 and a second supporting surface 433. The hinge base 42 may include a third supporting surface 441. The first supporting surface 432 and the second supporting surface 433 may respectively abut against the third supporting surface 441 to realize the switch between the first fixed position and the second fixed position.

In some embodiments, the glasses temple body 321 may be disposed with a hinge cavity 3211 along a length direction of the glasses temple body 321 communicating with an end face of the glasses temple body 321 away from an end of the glasses frame 31. A sidewall of the glasses temple body 321 may be disposed with a first insertion hole 3212 communicating with the hinge cavity 3211. An end of the hinge base 42 away from the hinge arm 43 may be inserted from an end surface of the glasses temple body 321 into the hinge cavity 3211, and fixed in the cavity 3211 by a fastener 323 inserted in the first insertion hole 3212 to connect the hinge 40 with the glasses temple body 321.

The hinge cavity 3211 may be formed during a molding process of the glasses temple body 321. For example, when the material of the glasses temple body 321 is rubber or plastic, the hinge cavity 3211 may be formed during an injection molding process of the glasses temple body 321. A shape of the hinge cavity 3211 may match with the hinge base 42, so that the hinge base 42 may be accommodated in the hinge cavity 3211. In the embodiments, the glasses temple body 321 may be a long straight rod along a length direction. Accordingly, the glasses temple body 321 may be a straight rod along the length direction. The hinge cavity 3211 may be arranged in the straight rod. Further, the hinge base 42 may be matched with the hinge cavity 3211 to be accommodated in the hinge cavity 3211 to realize the installation of the hinge 40. In other embodiments, the glasses temple body 321 may also have other shapes such as an arc-shaped rod, etc. Besides, the first insertion hole 3212 may also be formed during the molding process of the glasses temple body 321 or may be further formed on a sidewall of the glasses temple body 321 by drilling or other ways after molding. Specifically, a shape of the first insertion hole 3212 may be a circle. In other embodiments, the shape of the first insertion hole 3212 may also be a square, a triangle, or other shapes. A shape of the fastener 323 may match with the shape of the first insertion hole 3212, so that the fastener 323 may be inserted into the first insertion hole 3212 from outside of the glasses temple body 321. Further, the fastener 323 may fix the hinge base 42 in the hinge cavity 3211 by pressing against a sidewall of the hinge base 42 or penetrating an outer wall of the hinge base 42 in a plug-in way. Specifically, threads matching with the fastener 323 may be arranged on an inner wall of the first insertion hole 3212 and an outer wall of the fastener 323, so that the fastener 323 may be connected to the first insertion hole 3212 by screwing and further fix the hinge base 42 in the hinge cavity 3211. In other embodiments, the hinge base 42 may be fixed in the hinge cavity 3211 by an interference attach between the first insertion hole 3212 and the fastener 323.

In some embodiments, the hinge arm 43 may be connected to the connector 322. After the connector 322 is connected to the hinge arm 43, by installing the hinge base 42 in the hinge cavity 3211 of the glasses temple body 321, the connector 322 and the glasses temple body 321 may rotate around the shaft 41. The loudspeaker mechanism 20 may be connected to an end of the hinge arm 43 away from the hinge base 42, so that the loudspeaker mechanism 20 may be connected to an end of the glasses temple body 321 away from the glasses frame 31 through the hinge 40.

In the above embodiments, the glasses temple body 321 may be disposed with the hinge cavity 3211 communicating with an end surface of the glasses temple body 321. The hinge 40 may be configured by accommodating the hinge base 42 in the hinge cavity 3211, further, the fastener 323 may be passed through the first insertion hole 3212 to fix the hinge base 42 accommodated in the hinge cavity 3211, thus the hinge 40 may be detached and assembled to the glasses temple body 321. Therefore, when damaged, the loudspeaker mechanism 20, the glasses frame 31, the glasses temple body 321, etc. may be easy replaced.

Please refer to FIG. 14, in some embodiments, the hinge base 42 may be disposed with a second insertion hole 421 corresponding to the first insertion hole 3212. The fastener 323 may be further inserted into the second insertion hole 421.

Specifically, a shape of the second insertion hole 421 may be matched with the fastener 323, so that after passing through the first insertion hole 3212, the fastener 323 may be further inserted into the second insertion hole 421 to fix the hinge base 42. Therefore, the shaking of the hinge base 42 in the hinge cavity 3211 may be reduced and the hinge 40 may be fixed more firmly. Specifically, similar to the connection of the first insertion hole 3212 and the fastener 323, an inner sidewall of the second insertion hole 421 may be disposed with threads matching with that of an outer wall of the fastener 323 corresponding to the second insertion hole 421, so that the fastener 323 may be screwed together with the hinge base 42. Alternatively, the inner sidewall of the second insertion hole 421 and an outer sidewall of the fastener 323 at a contact position may be smooth surfaces, and the fastener 323 may be in an interference attach with the second insertion hole 421, which may not be specifically limited herein.

Further, the second insertion hole 421 may also penetrate both sides of the hinge base 42, so that the fastener 323 may further penetrate the entire hinge base 42 to fix the hinge base 42 in the hinge cavity 3211 more firmly.

Figure 15:
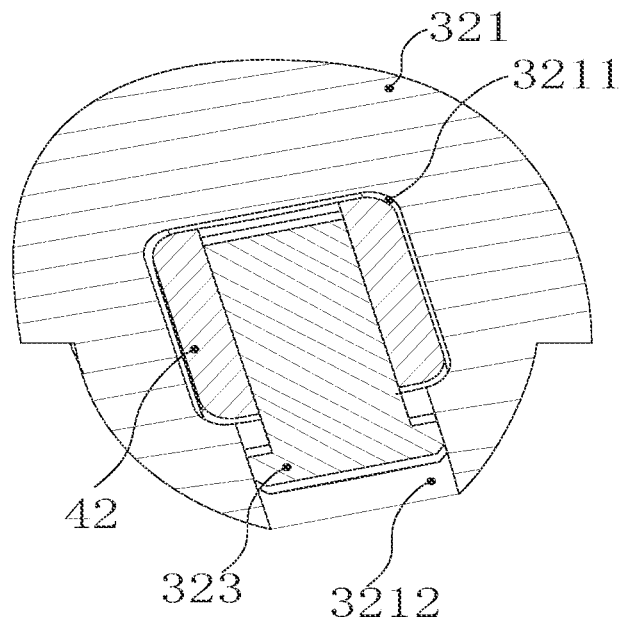
FIG. 15 is a sectional view of a loudspeaker along a B-B axis in FIG. 13.

Besides, please refer to FIG. 15. FIG. 15 is a sectional view of a loudspeaker along a B-B axis in FIG. 13. In some embodiments, on a section perpendicular to a length direction of the glasses temple body 321, a sectional shape of the hinge base 42 may match a sectional shape of the hinge cavity 3211 to form a sealed attach between the hinge base 42 and the glasses temple body 321 after insertion.

In an section shown in FIG. 15, the sectional shape of the hinge base 42 and the sectional shape of the hinge cavity 3211 may be any shape (such as columnar, prismatic), as long as the hinge base 42 may be inserted into the hinge cavity 3211 from the end surface of the glasses temple body 321 away from the hinge arm 43. Further, the first insertion hole 3212 may be arranged on a sidewall of the hinge cavity 3211 and pass through the sidewall of the hinge cavity 3211 to communicate with the hinge cavity 3211.

In an application scenario, both the sectional shape of the hinge base 42 and the sectional shape of the hinge cavity 3211 may be rectangular. The first insertion hole 3212 may be perpendicular to one side of the rectangle.

Specifically, in the application scenario, corners of an outer sidewall of the hinge base 42 or corners of an inner sidewall of the hinge cavity 3211 may be further rounded to make the contact between the hinge base 42 and the hinge cavity 3211 smoother, so that the hinge base 42 may be inserted smoothly into the hinge cavity 3211.

It should be noted that before the hinge 40 is assembled, a certain amount of gas may be stored in the hinge cavity 3211. Therefore, if the hinge cavity 3211 is a cavity with only one open end, it may be difficult to discharge the gas in the hinge cavity 3211 during the assembly process, which is not conducive to the insertion of the hinge base 42 and affects the assembly. In the embodiments, the first insertion hole 3212 may penetrate the sidewall of the hinge cavity 3211 and communicate with the hinge cavity 3211, which may assist in discharging the internal gas through the hinge cavity 3211 from the first insertion hole 3212 during the assembly process, thereby facilitating the normal assembly of the hinge 40.

Figure 16:
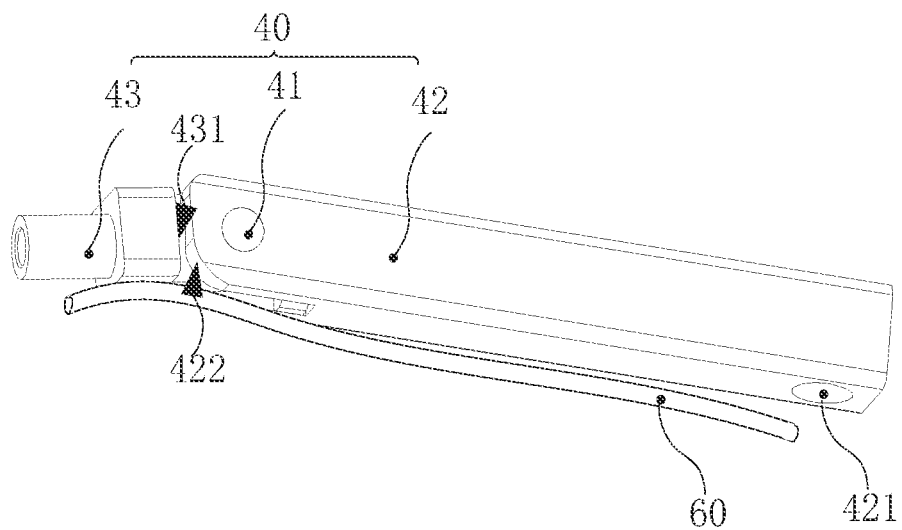
FIG. 16 is a schematic diagram illustrating a partial structure of a loudspeaker according to some embodiments of the present disclosure.

FIG. 16 is a schematic diagram illustrating a partial structure of a loudspeaker according to some embodiments of the present disclosure. As shown in FIG. 16, in some embodiments, the hinge 40, etc. may be configured to connect the loudspeaker mechanism 20 to an end of the glasses temple body 321 away from the glasses frame 31.

Further, the hinge base 42 may include a first end surface 422. The hinge arm 43 may include a second end surface 431 arranged opposite to the first end surface 422. It should be easy to understand that there may be a certain gap between the first end surface 422 and the second end surface 431, that is, the first end surface and the second end surface may be in a clearance attach, so that the hinge base 42 and the hinge arm 43 may rotate relative to each other around the shaft 41. In the embodiments, during the relative rotation of the hinge arm 43 and the hinge base 42, a relative position between the first end surface 422 and the second end surface 431 may also change accordingly, thereby making the gap between the first end surface 422 and the second end surface 431 larger or smaller.

Specifically, please refer to FIG. 17 to FIG. 21. In some embodiments, the hinge arm 43 of the hinge 40 may at least include a first supporting surface 432 and a second supporting surface 433 connected to each other. The hinge 40 may further include a supporting component 44 and an elastic component 45. The supporting component 44 may be movably arranged on the hinge base 42 and include a third supporting surface 441. The elastic component 45 may be used to elastically bias the supporting component 44 toward the hinge arm 43, so that the third supporting surface 441 may elastically abut against the first supporting surface 432 and the second supporting surface 433, respectively. In some embodiments, the hinge 40 may also include a plurality of supporting surfaces. Each supporting surface may abut against the third supporting surface to realize the switch between a plurality of fixed positions.

In some embodiments, when the loudspeaker mechanism 20 or the connector 322 receives an external force to drive the hinge arm 43 to rotate relative to the hinge base 42, the supporting component 44 may be pushed by a connection 434 of the first supporting surface 432 and the second supporting surface 433 to overcome the elastic bias of the elastic component 45 and move in an opposite direction, so that the third supporting surface 441 may be switched from elastically abutting against one of the first supporting surface 432 and the second supporting surface 433 to elastically abutting against other of the first supporting surface 432 and the second supporting surface 433.

In an application scenario, the supporting component 44 may be connected to an end of the elastic component 45 that is facing the hinge arm 43. The third supporting surface 441 may face a side of the hinge arm 43. Therefore, when the hinge arm 43 is subjected to an external force to rotate around the shaft 41 relative to the hinge base 42, the third supporting surface 441 may be pushed, so that the supporting component 44 may press the elastic component 45 and be further elastically biased under the action of the elastic component 45. Certainly, the supporting component 44 may not be connected to the elastic component 45, but only abut against one side of the supporting component 44, as long as the supporting component 44 may achieve the above elastic bias.

The first supporting surface 432 and the second supporting surface 433 may be respectively two adjacent side surfaces of the hinge arm 43 that is at least partially parallel to a central axis of the shaft 41 or a part of the two adjacent side surfaces. when the hinge arm 43 rotates relative to the hinge base 42, the first supporting surface 432 and the second supporting surface 433 may rotate with the hinge arm 43 around the shaft 41, so that different sides of the hinge arm 43 may face the hinge base 42 and the hinge arm 43 may have different relative positional relationships with the hinge base 42. Besides, the elastic component 45 may be a component that may provide an elastic force and may be compressed in a direction of the elastic force to provide a certain compression space. For example, the elastic component 45 may be a spring. One end of the spring may abut against the supporting component 44. When the third supporting surface 441 of the supporting component 44 is pushed toward the elastic component 45, the elastic component 45 may oppose the supporting component 44 and may be compressed to provide space in a direction of the third supporting surface 441 of the supporting component 44, so that when a relative position of the shaft 41 remains unchanged, there may be still enough space for different sides of the hinge arm 43 to rotate between the shaft 41 and the third supporting surface.

Specifically, when the hinge arm 43 rotates relative to the hinge base 42, the relative position of the shaft 41 may not change, and a contact position between the hinge arm 43 and the third supporting surface 441 of the hinge base 42 may change. Different positions of the hinge arm 43 have different distances from the shaft 41. Therefore, when the hinge arm 43 is in contact with the third supporting surface 441 at different positions of the hinge arm 43, such as at the first supporting surface 432 and at the second supporting surface 433, required spaces between the shaft 41 and contact points between the hinge arm 43 and the third supporting surface 441 may be different. However, due to elasticity and space constraints, the space provided by the compression of the elastic component 45 may be limited. Therefore, during the rotation of the hinge arm 43 relative to the hinge base 42, on a section of the shaft 41 perpendicular to the central axis of the shaft 41, if a distance between a certain position on the hinge arm 43 and the shaft 41 is too large, the position may be stuck at another position on the third supporting surface 441 and may make the hinge arm 43 unable to rotate continuously, so that the hinge arm 43 and the hinge base 42 may only rotate relatively within a certain range. In an application scenario, during the relative rotation between the hinge arm 43 and the hinge base 42 around the shaft 41, only the second supporting surface 433, the first supporting surface 432, and an area corresponding to the connection 434 between the first supporting surface 432 and the second supporting surface 433 may abut against the third supporting surface 441.

Further, in the embodiments, the first supporting surface 432 and the second supporting surface 433 may both be flat. The hinge 40 may have two relatively stable states including the third supporting surface 441 abutting against the first supporting surface 432 and the third supporting surface 441 abutting against the second supporting surface 433.

Certainly, in other embodiments, the first supporting surface 432 and the second supporting surface 433 may also be curved surfaces with a certain curvature, or even may include different sub-supporting surfaces, as long as the positional relationship between the hinge arm 43 and the hinge base 42 has at least two relatively stable states, which may not be specifically limited herein. Besides, the hinge arm 43 may also be disposed with other more supporting surfaces. When the hinge arm 43 is subjected to an external force to cause the hinge arm 43 to rotate relative to the hinge base 42 around the shaft 41, different supporting surfaces on the hinge arm 43 may elastically abut against the third supporting surface 441, so that the hinge arm 43 and the hinge base 42 may have a variety of different relative positional relationships, which may not be specifically limited herein.

Figure 17:
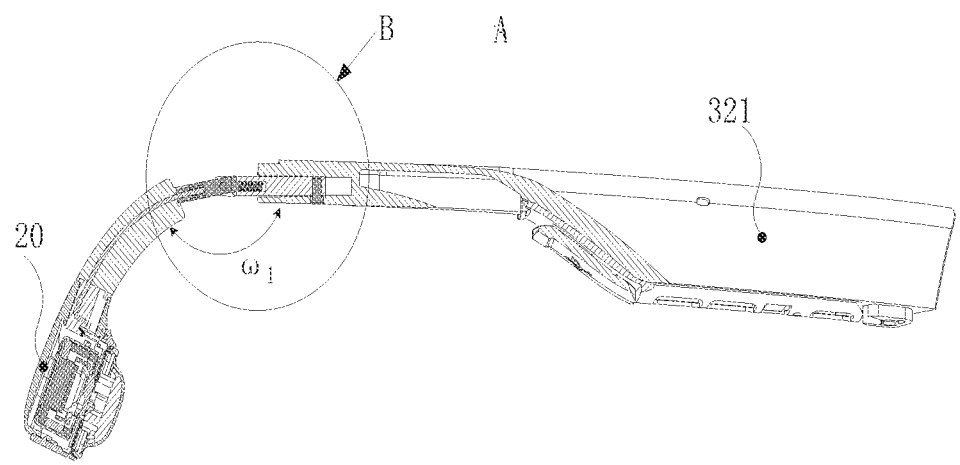
FIG. 17 is a sectional view illustrating a partial structure of a loudspeaker according to some embodiments of the present disclosure.
Figure 18:
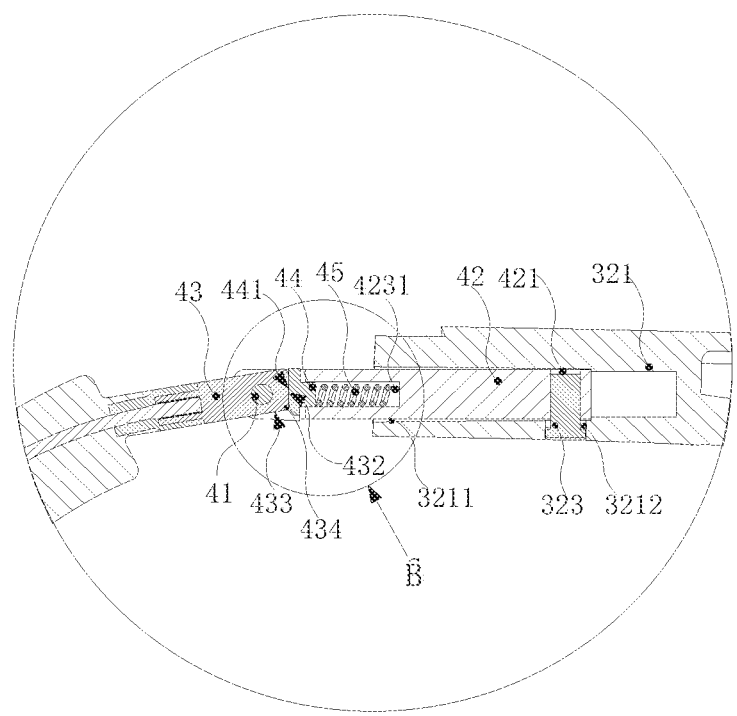
FIG. 18 is an enlarged view of a part A in FIG. 17.

Specifically, as shown in FIG. 17 and FIG. 18, taking an initial state that the first supporting surface 432 abuts against the third supporting surface 441 of the supporting component 44 as an example, the elastic component 45 may have an elastic compression deformation or be in an original natural state, which may not be limited herein. When the hinge 40 is subjected to the external force to cause the hinge arm 43 to rotate relative to the hinge base 42 around the shaft 41 to make the second supporting surface 433 gradually approach the third supporting surface 441, the connection 434 of the first supporting surface 432 and the second supporting surface 433 may be in contact with the third supporting surface 441. Since a distance from the connection 434 to the shaft 41 is greater than a distance from the first supporting surface 432 to the shaft 41, the connection 434 may abut against the supporting component 44 and push the supporting component 44 to move toward the elastic component 45, so that the elastic component 45 may overcome the thrust and generate compression. When the hinge arm 43 is further stressed, the connection 434 may gradually approach an area between the shaft 41 and the third supporting surface 441. In this process, a distance between the shaft 41 and the third supporting surface 441 may gradually increase. It may be easy to understand that when a connection line between the connection 434 and the shaft 41 is perpendicular to the third supporting surface 441, on the section of the shaft 41 perpendicular to the central axis of the shaft 41, the distance from the shaft 41 to the third supporting surface 441 may be equal to the distance from the shaft 41 to the connection 434. At this time, the shaft 41 may be the farthest from the third supporting surface 441. If the hinge 40 to be forced continuously, the distance from the shaft 41 to the third supporting surface 441 may gradually become smaller, so that the compression of the elastic component 45 required may be reduced, and the elastic component 45 may gradually release the elastic force and recover until the connection 434 leaves the third supporting surface 441 to make the second supporting surface 433 abut against the third supporting surface 441, thereby realizing the switch from the first supporting surface 432 abutting against the third supporting surface 441 to the second supporting surface 433 abutting against the third support surface 441.

Similarly, when the initial state is that the second supporting surface 433 abuts against the third supporting surface 441 of the supporting component 44 (e.g., shown in FIG. 20 and FIG. 21), a switch process from the second supporting surface 433 abutting against the third supporting surface 441 to the first supporting surface 432 abutting against the third supporting surface 441 may be similar to the above process.

It should be noted that when the third supporting surface 441 is switched from elastically abutting against one of the first supporting surface 432 and the second supporting surface 433 to elastically abutting against the other one of the first supporting surface 432 and the second supporting surface 433, the hinge 40 may drive the loudspeaker mechanism 20 to switch between the first fixed position and the second fixed position relative to the glasses temple body 321 and the loudspeaker mechanism 20 may attach on the back of the user's auricle when being in the first fixed position.

In some embodiments, a distance between the shaft 41 and the connection 434 may be greater than a vertical distance between the shaft 41 and the first supporting surface 432 and a vertical distance between the shaft 41 and the second supporting surface 433, so that a state of the hinge 40 may have a certain degree of the jump during the above process in which the third supporting surface 441 is switched from elastically abutting against one of the first supporting surface 432 and the second supporting surface 433 to elastically abutting against the other one of the first supporting surface 432 and the second supporting surface 433.

Specifically, taking the first supporting surface 432 and the third supporting surface 441 elastically abutting against each other to switch to the second supporting surface 433 and the third supporting surface 441 elastically abutting against each other as an example, when a ratio between a maximum distance from the shaft 41 to the connection 434 and the shortest distance from the shaft 41 to the first supporting surface 432 is different, the degree of jump generated during the switching process may be different.

In some embodiments, on the section of the shaft 41 perpendicular to the central axis of the shaft 41, the ratio between the maximum distance from the shaft 41 to the connection 434 and the shortest distance from the shaft 41 to the first supporting surface 432 may be 1.1-1.5. Specifically, the shaft 41 may be arranged away from the second supporting surface 433 and close to a side surface of the hinge arm 43 opposite to the second supporting surface 433, so that the maximum distance from the shaft 41 to the connection 434 may be greater than the shortest distance from the shaft 41 to the first supporting surface 432, thereby satisfying the ratio mentioned above.

It should be noted that when the ratio between the maximum distance from the shaft 41 to the connection 434 and the shortest distance from the shaft 41 to the first supporting surface 432 is too large, the degree of the jump may be obvious. However, it may be necessary to exert greater force to switch the elastically abutment between the first supporting surface 432 and the third supporting surface 441 to the elastically abutment between the second supporting surface 433 and the third supporting surface 441, which is inconvenient to use to a certain extent. When the ratio between the maximum distance from the shaft 41 to the connection 434 and the shortest distance from the shaft 41 to the first supporting surface 432 is too small, the above switching may be easier. However, the degree of the jump may be relatively small. For example, when the user pulls the hinge 40, there may be no obvious tactile feeling, which may cause inconvenience. In the embodiments, the ratio between the maximum distance from the shaft 41 to the connection 434 and the shortest distance from the shaft 41 to the first supporting surface 432 may be set to be 1.1-1.5. In such cases, when the third supporting surface 441 is switched from elastically abutting against the first supporting surface 432 to elastically abutting against the second supporting surface 433, the hinge 40 may have a more obvious jump. Therefore, during usage, the user may have a more obvious tactile feeling when pulling the hinge 40. At the same time, the jump may not be too abrupt, and too abrupt jump makes it difficult for the user to switch the state of the hinge 40.

In some embodiments, the ratio between the maximum distance from the shaft 41 to the connection 434 and the shortest distance from the shaft 41 to the first supporting surface 432 may also be 1.2-1.4. Specifically, the ratio between the maximum distance from the shaft 41 to the connection 434 and the shortest distance from the shaft 41 to the first supporting surface 432 may also be 1.1, 1.2, 1.3, 1.4, 1.5, etc., which may not be specifically limited herein.

Figure 20:
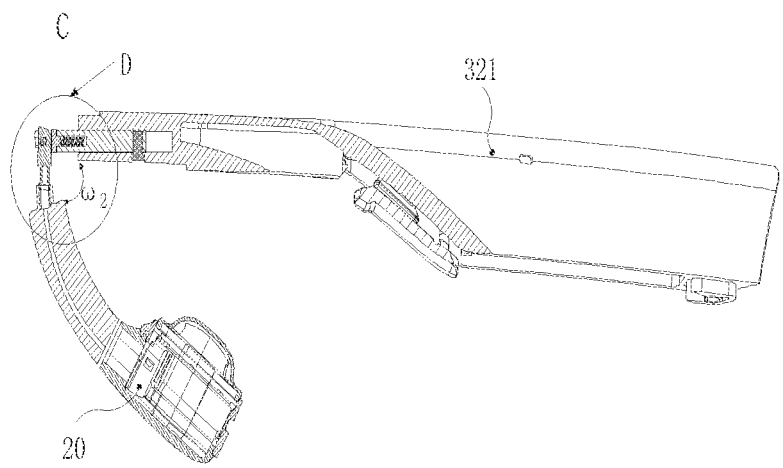
FIG. 20 is a sectional view illustrating a partial structure of a loudspeaker according to some embodiments of the present disclosure.

Further, positions of the first supporting surface 432 and the second supporting surface 433 on the hinge arm 43 may affect an angle between the hinge arm 43 and the hinge base 42 when the third supporting surface 441 abuts one of the first supporting surface 432 or the second supporting surface 433. Therefore, the positions of the first supporting surface 432 and the second supporting surface 433 on the hinge arm 43 may be set differently according to specific usage requirements. The angle between the hinge arm 43 and the hinge base 42 is shown in FIG. 17 and FIG. 20. $\omega_1$ may be an angle between the hinge arm 43 and the hinge base 42 when the third supporting surface 441 abuts against the first supporting surface 432. $\omega_2$ may be an angle between the hinge arm 43 and the hinge base 42 when the third supporting surface 441 abuts against the second supporting surface 433. In some embodiments, both the hinge arm 43 and the hinge base 42 may have a certain length. The hinge arm 43 may be arranged on a side of an end of the hinge base 42 in a length direction of the hinge base 42. The first supporting surface 432 may be arranged at an end of the hinge arm 43 close to the hinge base 42 in the length direction of the hinge base 42. The second supporting surface 433 may be arranged at one end of the hinge arm 43 in a width direction d of the hinge arm 43, and parallel to the central axis of the shaft 41. In such cases, when the third supporting surface 441 abuts against the first supporting surface 432, the angle between the hinge arm 43 and the hinge base 42 may be the largest, and when the third supporting surface 441 abuts against the second supporting surface 433, the angle between the hinge arm 43 and the hinge base 42 may be the smallest, so that when the third supporting surface 441 is switched from elastically abutting against the first supporting surface 432 to elastically abutting against the second supporting surface 433, the angle between the hinge base 42 and the hinge arm 4312 may be changed from $\omega_1$ to $\omega_2$ and become smaller.

It should be further noted that if a direction of a force applied to the hinge arm 43 is consistent with a direction of gravity of the hinge arm 43 when the third supporting surface 441 is switched from elastically abutting against the first supporting surface 432 to elastically abutting against the second supporting surface 433, the switching may make the angle between the hinge base 42 and the hinge arm 4312 smaller. In the embodiments, the ratio between the maximum distance from the shaft 41 to the connection 434 and the shortest distance from the shaft 41 to the first supporting surface 432 may also be set so that the loudspeaker mechanism 20 may not reduce the angle between the hinge arm 43 and the hinge base 42 spontaneously due to the gravity of the hinge arm 43 when the third supporting surface 441 elastically abuts against the first supporting surface 441.

Figure 19:
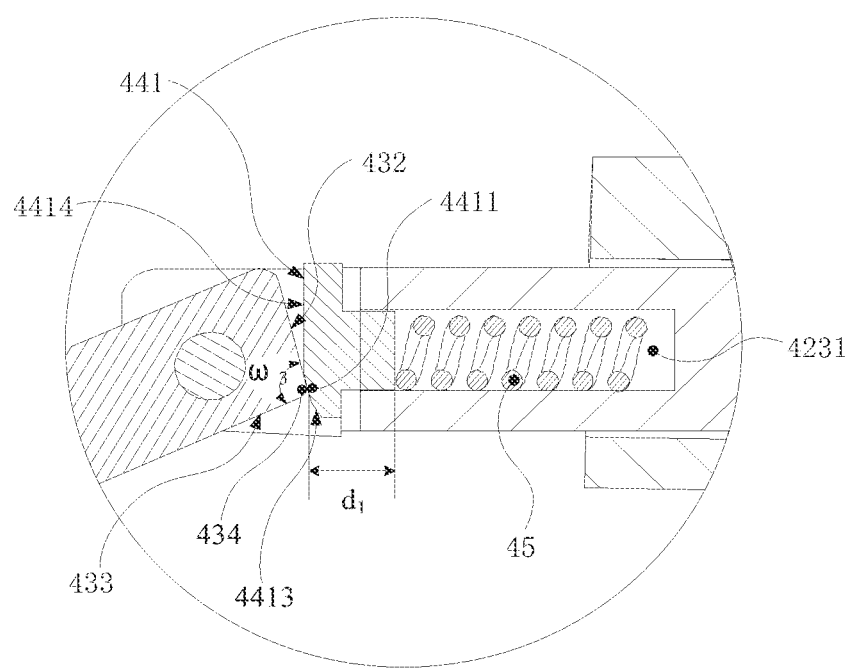
FIG. 19 is an enlarged view of a part B in FIG. 18.

Please refer to FIG. 19. In some embodiments, on the section of the shaft 41 perpendicular to the central axis of the shaft 41, the angle $\omega_3$ between the first supporting surface 432 and the second supporting surface 433 may be an obtuse angle.

When the hinge 40 is switched from a state in which the first supporting surface 432 abuts against the third supporting surface 441 to a state in which the second supporting surface 433 abuts against the third supporting surface 441, the smaller the angle $\omega_3$ between the first supporting surface 432 and the second supporting surface 433, the greater a relative rotation angle between the hinge base 42 and the hinge arm 43 when the state is switched. In other words, when the hinge base 42 is fixed, the user may need to pull the hinge arm 43 to a larger angle to switch the state of the hinge 40, which may be laborious for the user and bring inconvenience to the user.

The hinge arm 43 may have a certain length, the first supporting surface 432 may be arranged at one end of the hinge arm 43 in the length direction of the hinge arm 43, the second supporting surface 433 and the first supporting surface 432 may be arranged adjacently in the width direction of the hinge arm 43. Therefore, if the first supporting surface 432 and the second supporting surface 433 are arranged vertically, when the hinge 40 needs to be switched between the above two states, the hinge arm 43 and the hinge base 42 may be pulled relatively by 90°.

In some embodiments, on the section of the shaft 41 perpendicular to the central axis of the shaft 41, the angle $\omega_3$ between the first supporting surface 432 and the second supporting surface 433 may be the obtuse angle, so that when the hinge 40 is switched between the above two states, the hinge arm 43 and the hinge base 42 may need to be pulled relatively at an angle less than 90°. Specifically, the hinge 40 may be used to connect the glasses temple body 321 and the loudspeaker mechanism 20 together. When the hinge 40 is in the second state in which the second supporting surface 433 abuts against the third supporting surface 441, the loudspeaker mechanism 20 may be in the first fixed position to attach the back of the user's auricle. Therefore, when the user needs to use the function of the loudspeaker mechanism 20 of the glasses, the loudspeaker mechanism 20 only needs to be rotated by an angle less than 90° to attach the back of the user's auricle. Besides, when the hinge 40 is in the first state in which the first supporting surface 432 abuts against the third supporting surface 441, the hinge arm 43 and the loudspeaker mechanism 20 connected to the hinge arm 43 may form a certain angle. Therefore, when the user wears the glasses, the hinge arm 43 and the loudspeaker mechanism 20 connected to the hinge arm 43 may be arranged behind the user's ear and face the user's ear, which can block and fixing the glasses to prevent the glasses from falling from the user's head.

In some embodiments, the angle $\omega_3$ between the first supporting surface 432 and the second supporting surface 433 may be set according to actual needs. It should be noted that when the angle $\omega_3$ is too large, angles between the hinge base 42 and the hinge arm 43 and between the hinge base 42 and the loudspeaker mechanism 20 connected to an end of the hinge arm 43 away from the hinge base 42 may be small. Therefore, when the user wears the glasses, the hinge arm 43 and the loudspeaker mechanism 20 may be too close to the user's ears, which may cause pressure on the user's ears and reduce the user's comfort feeling. When the angle $\omega_3$ is too small, on the one hand, the angle required to pull the loudspeaker mechanism 20 may be too large when the user may need to switch the fixed position of the loudspeaker mechanism 20, which is inconvenient for the user. On the other hand, as described in the above embodiments, the angles formed between the glasses temple body 321 and the hinge 40 and between the glasses temple body 321 and the loudspeaker mechanism 20 may be small, so that it is difficult to fix the glasses. Therefore, when the user wears the glasses, the glasses may easily fall from a front side of the user's head. In some embodiments, the angle $\omega_3$ between the first supporting surface 432 and the second supporting surface 433 may be set according to a head shape of the user, so that the user may wear it better.

Specifically, in an application scenario, on the section of the shaft 41 perpendicular to the central axis of the shaft 41, the angle $\omega_3$ between the first supporting surface 432 and the second supporting surface 433 may be 100°-120°. Specifically, the angle $\omega_3$ may be 100°, 110°, 120°, etc. The angle $\omega_3$ is set so that the loudspeaker mechanism 20 may not be too close to the user's ears and cause discomfort to the user's ears when the user wears the glasses and the loudspeaker mechanism 20 is in the first fixed position and there may be no need to rotate the hinge 40 by an excessively large angle when the two relative positions of the loudspeaker mechanism 20 are switched, which is convenient for the user to use.

During the process in which the third supporting surface 441 is switched from elastically abutting against one of the first supporting surface 432 and the second supporting surface 433 to elastically abutting against the other one of the first supporting surface 432 and the second supporting surface 433, the connection 434 between the first supporting surface 432 and the second supporting surface 433 may abut against the third supporting surface 441 and push the supporting component 44 to overcome the elastic bias of the elastic component 45 to move in the opposite direction. Taking the third supporting surface 441 abutting against the first supporting surface 432 before the switching as an example, in an initial state of the switching, the connection 434 may gradually abut against the third supporting surface 441 while the first supporting surface 432 is gradually moving away from the third supporting surface 441. During the switching process, the connection 434 may slide from one side of the third supporting surface 441 to the other side of the third supporting surface 441. Finally, the second supporting surface 433 may elastically abut against the third supporting surface 441. During the switching process, the connection 434 may always abut against and interact with the third supporting surface 441, and a shape of the connection 434 may have a certain influence on the switching process. For example, if the first supporting surface 432 and the second supporting surface 433 are linearly connected, the connection 434 may have a relatively sharp angle. Therefore, when the user pulls the hinge base 42 and/or the hinge arm 43 to switch the state of the hinge 40, on the one hand, when the connection 434 abuts against the third supporting surface 441 is switched to the connection 434 abuts against the first supporting surface 432 and the second supporting surface 433, the cushioning of the switching is small and the switching is abrupt, so that the feeling of pulling the hinge 40 is bad. On the other hand, the connection 434 may be sharper, which may cause a certain amount of wear on the third supporting surface 441 during the repeated switching process.

In some embodiments, the third supporting surface 441 may be configured such that an external force required when the third supporting surface 441 is switched from elastically abutting against the first supporting surface 432 to elastically abutting against the second supporting surface 433 may be different from an external force required when the third supporting surface 441 is switched from elastically abutting against the second supporting surface 433 to elastically abutting against the first supporting surface 432.

It should be noted that the switching of the state of the hinge 40 may drive the loudspeaker mechanism 20 to switch between the first fixed position and the second fixed position relative to the glasses temple body 321. Accordingly, the two fixed positions respectively correspond to two states including the user using the loudspeaker mechanism 20 and the user not using the loudspeaker mechanism 20. When the user wears glasses, the magnitudes of force applied by the user for switching between the two states may be different when the hand is applied to the back of the head. Therefore, the switching of different states may be designed to require different external forces, which may be convenient for users to use. In some embodiments, an external force that the user needs to apply when switching from not using the function of the loudspeaker mechanism 20 to using the function of the loudspeaker mechanism 20 may be greater than an external force that the user needs to apply when switching from using the function of the loudspeaker mechanism 20 to not using the function of the loudspeaker mechanism 20.

In some embodiments, when the third supporting surface 441 is switched from elastically abutting with the first supporting surface 432 to elastically abutting with the second supporting surface 433, which may correspond to pulling the loudspeaker mechanism 20 from the second fixed position to the first fixed position to attach on the back of the user's auricle.

Figure 22:
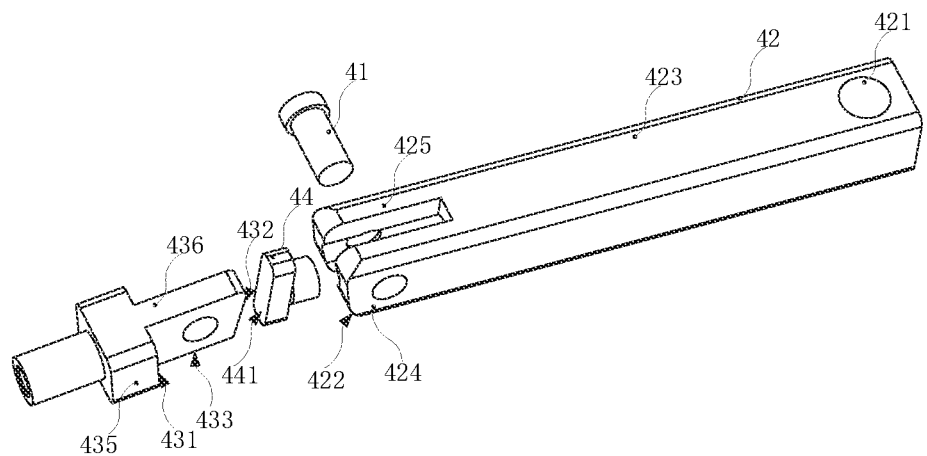
FIG. 22 is an exploded view illustrating a partial structure of a loudspeaker according to some embodiments of the present disclosure.
Figure 23:
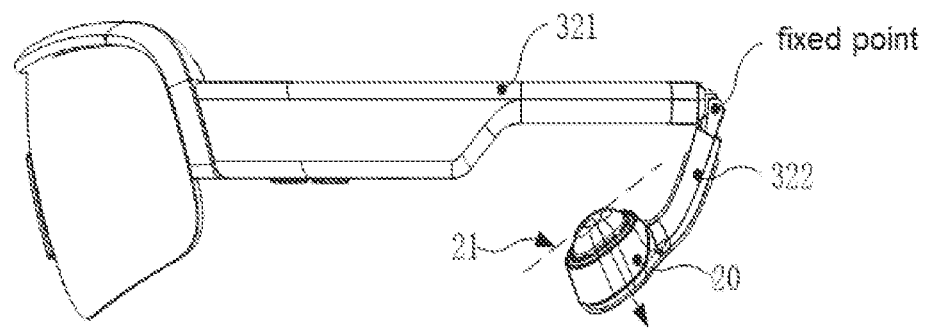
FIG. 23 is a schematic diagram illustrating a pressure test of an auricle by a loudspeaker mechanism of a loudspeaker according to some embodiments of the present disclosure.
Figure 24:
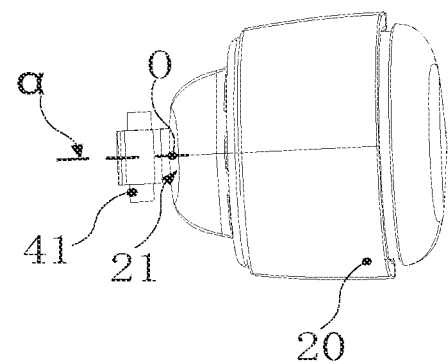
FIG. 24 is a schematic diagram illustrating an α plane of a loudspeaker according to some embodiments of the present disclosure.
Figure 25:
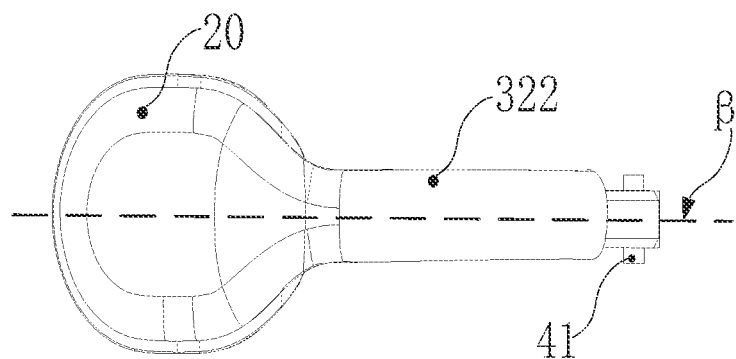
FIG. 25 is a schematic diagram illustrating a β plane of a loudspeaker according to some embodiments of the present disclosure.

FIG. 22 is an exploded view illustrating a partial structure of a loudspeaker according to some embodiments of the present disclosure. Please refer to FIG. 22. In some embodiments, the hinge base 42 may include a base body 423, and a first lug 424 and a second lug 425 protruding from the base body 423 and spaced apart from each other. The hinge arm 43 may include an arm body 435 and a third lug 436 protruding from the arm body 435. The third lug 436 may be inserted into an interval area between the first lug 424 and the second lug 425, and rotatably connected with the first lug 424 and the second lug 425 through the shaft 41. The first supporting surface 432 and the second supporting surface 433 may be arranged on the third lug 436. The supporting component 44 may be at least partially arranged in the interval area and arranged on a side of the third lug 436 facing the base body 423. The base body 423 may be disposed with an accommodating cavity 4231 communicating with the interval area. The elastic component 45 may be arranged in the accommodating cavity 4231 and elastically biases the supporting component 44 toward the third lug 436.

Specifically, the first lug 424, the second lug 425, and the third lug 436 may be respectively disposed with a first through-hole, a second through-hole, and a third through-hole located in the same axial direction. Inner diameters of the three through-holes may not be smaller than an outer diameter of the shaft 41, so that when the shaft 41 passes through a through-hole corresponding to the shaft 41, the hinge base 42 where the first lug 424 and the second lug 425 are located may be rotatably connected to the hinge arm 43 where the third lug 436 is located.

The first supporting surface 432 and the second supporting surface 433 may be both arranged on the third lug 436 and parallel to the central axis of the shaft 41. As a result, when the hinge arm 43 rotates around the shaft 41 relative to the hinge base 42, both the first supporting surface 432 and the second supporting surface 433 may enter the interval area between the first lug 424 and the second lug 425.

Further, the supporting component 44 may be arranged between the first lug 424 and the second lug 425 of the base body 423. The third supporting surface 441 of the supporting component 44 may be arranged toward the third lug 436. In an application scenario, the elastic component 45 may be completely arranged in the accommodating cavity 4231 and in contact with the supporting component 44 on a side of the accommodating cavity 4231 facing the interval area between the first lug 424 and the second lug 425. When the elastic component 45 is in a natural state, at least a part of an area of the supporting component 44 close to the elastic component 45 may be arranged in the accommodating cavity 4231. It should be noted that a shape of the part of the supporting component 44 arranged in the accommodating cavity 4231 may match with the accommodating cavity 4231, so that when the elastic component 45 elastically biases the supporting component 44, the part of the supporting component 44 arranged in the accommodating cavity 4231 may slide stably in the accommodating cavity 4231.

In some embodiments, a first end surface 422 of the hinge base 42 may be end surfaces of the first lug 424 and the second lug 425 facing the hinge arm 43. The third lug 436 protruding from the arm body 435 may be arranged in the interval area between the first lug 424 and the second lug 425, so that the first end surface 422 of the first lug 424 and the second lug 425 may be set toward the arm body 435. On a section of the shaft 41 in a direction of the central axis of the shaft 41, the arm body 435 may further protrude from the third lug 436 to form the second end surface 431 facing the first lug 424 and the second lug 425 of the hinge base 42.

In some embodiments, the connector 322 may be an elastic structure, which may provide a certain pressure to attach the attachment surface 21 of the loudspeaker mechanism 20 to the back of the auricle when the loudspeaker mechanism 20 is in the second fixed position.

The pressure may refer to a pressure exerted on the user's ears by the attachment surface 21 in a direction perpendicular to the attachment surface 21 when the user normally wears the loudspeaker (such as glasses). The different elastic coefficients of the material of the connector 322, a shape and specification of the connector 322, etc. may affect the pressure applied by the attachment surface 21 of the loudspeaker mechanism 20 to the back of the user's auricle. Specifically, the pressure applied by the attachment surface 21 to the back of the user's auricle may be obtained through testing. Specifically, please refer to FIG. 23. In the normal usage state of the user, the attachment surface 21 of the loudspeaker mechanism 20 may attach well with the back of the auricle. A central point of a connection between the glasses temple body 321 and the connector 322 may be a fixed point to fix the hinge 40. The loudspeaker mechanism 20 may be pulled away from the back of the auricle in a direction perpendicular to the attachment surface 21 using a force measuring device. A force measured when the loudspeaker mechanism 20 is separated from the back of the auricle may be taken as the pressure exerted by the loudspeaker mechanism 20 on the back of the user's auricle. According to the measured pressure value, the material, shape, specification, etc., of the connector 322 may be further determined to adjust the pressure within an appropriate range.

In some embodiments, the shape of the connector 322 may be changed according to the actual needs of the user, so that the pressure may be a variable value. For example, when the user wears the glasses, different wearing states, people with different head shapes, and personal wearing habits may correspond to different pressure values. For example, some users may prefer the glasses to attach their heads better, some users may need a non-tactile wearing experience (that is, the pressure of attaching may not be easy to be perceived), some users may have wider heads, and some users may have narrower heads. Since the connector 322 is a flexible connecting rod and a shape of the connector 322 may be adjusted, the connector 322 may be deformed to different degrees according to the different needs of the wearer to adapt to different situations.

In an application scenario, an upper limit of the pressure may be 1 N, which may prevent the loudspeaker mechanism 20 from being deformed due to excessive pressure and cause other discomforts such as pain of the user. The lower limit of the pressure may be 0.1 N, so that the attachment surface 21 of the loudspeaker mechanism 20 is always attached to the back of the auricle during operation and the loudspeaker mechanism 20 is not separated from the back of the auricle due to the vibration of the loudspeaker.

In some embodiments, the upper limit of the pressure may also be 0.8 N, which may further reduce the deformation of the auricle and ensure that the user may not have discomfort when wearing for a long time. At the same time, the lower limit of the pressure may also be 0.3 N, so that when the loudspeaker mechanism 20 firmly attaches the back of the user's auricle, a contact area between the back of the auricle and the loudspeaker mechanism 20 is enlarged due to the proper deformation of the auricle. As a result, the contact area may be large enough to transmit sound/vibration and the loudspeaker may have enough volume.

Specifically, the upper limit and lower limit of the pressure may also be other values between 0.1 N and 1 N to satisfy the different needs of people such as Europeans, Americans, Asians, men, women, etc., which may not be specifically limited herein.

In some embodiments, a vertical plane α of the shaft 41 of the hinge 40, a symmetry plane β of the connector 322, and a center point O of the attachment surface 21 of the loudspeaker mechanism 20 attaching the ear may be in a same plane or a same relative plane within a predetermined error range.

The vertical plane α of the shaft 41 of the hinge 40 refers to a plane perpendicular to the axial direction of the shaft 41 of the hinge 40 and symmetrically dividing the shaft 41 of the hinge 40. More details regarding the vertical plane α may refer to FIG. 24.

In some embodiments, the symmetry plane β of the connector 322 refers to a plane that divides the connector 322 symmetrically, that is, the connector 322 may be distributed symmetrically on both sides of the symmetry plane β of the connector 322. More details regarding the symmetry plane β may refer to FIG. 25.

The predetermined error range may be obtained based on experience, the materials and specifications of the connector 322, and the statistical data of shapes of ears.

It should be noted that when the vertical plane α of the shaft 41 of the hinge 40, the symmetry plane β of the connector 322, and the center point of the attachment surface 21 of the loudspeaker mechanism 20 may be in the same plane, which enables the loudspeaker mechanism 20 connected with the connector 322 to directly attach the back of the user's auricle. When the connector 322 deforms by a force, a deformation direction of the connector 322 and a moving direction of the loudspeaker mechanism 20 may be the same and in the plane. Otherwise, when the connector 322 deforms by a force, the deformation direction of the connector 322 and the moving direction of the loudspeaker mechanism 20 may b note the same plane, such that the loudspeaker mechanism 20 may not attach or completely attach the back of the user's auricle due to the twisting of the connector 322 and the loudspeaker mechanism 20, thereby resulting in a reduction in the efficiency of sound/vibration transmission and reducing the sound quality of the loudspeaker. Certainly, the vertical plane α of the shaft 41 of the hinge 40, the symmetry plane β of the connector 322, and the center point of the attachment surface 21 of the loudspeaker mechanism 20 may be in the relative plane within the predetermined error range, which may not cause too much influence on the user during the usage process, but may affect the attaching effect of the attachment surface 21 of the loudspeaker mechanism 20 and the back of the user's auricle to a certain extent.

In some embodiments, when the loudspeaker mechanism 20 is at the first fixed position with respect to the glasses temple body 321, an angle between a horizontal reference plane γ defined by the tops of the two temple bodies 321 and the symmetry plane β of the connector 322 may be 65°-85°.

Figure 26:
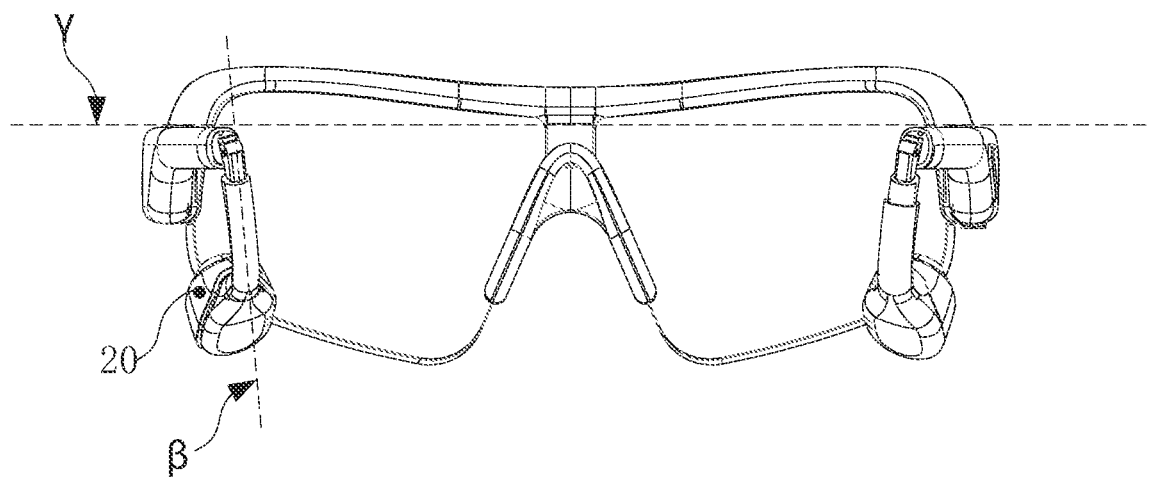
FIG. 26 is a schematic diagram illustrating a γ plane of a loudspeaker according to some embodiments of the present disclosure.

The horizontal reference plane γ defined by the tops of the two temple bodies 321 refers to a plane tangent to the tops of the two temple bodies 321. In an application scenario, as shown in FIG. 26, the horizontal reference plane γ may further be perpendicular to a symmetry plane of the glasses frame 31. The symmetry plane β of the connector 322 may be the same as that shown in FIG. 25, which may not be repeated herein.

It may be easy to understand that when the loudspeaker mechanism 20 is at the first fixed position relative to the glasses temple body 321, if the angle between the horizontal reference plane γ defined by the tops of the two temple bodies 321 and the symmetry plane β of the connector 322 is large, the loudspeaker mechanism 20 may be closer to the outer side of the back of the auricle. If the angle is too large, the loudspeaker mechanism 20 may not even attach to the auricle. If the angle is small, the loudspeaker mechanism 20 may be too close to the inside of the back of the auricle, and even compress the skull of the head, which may reduce the comfort of the user and affect the sound/vibration transmission of the loudspeaker through the ear cartilage, thereby reducing the sound quality of the loudspeaker mechanism 20. When the angle is in a range of 65° to 85°, the loudspeaker mechanism 20 may be attached to a relatively moderate position on the back of the user's auricle.

Besides, when the loudspeaker mechanism 20 is at the first fixed position relative to the glasses temple body 321, the angle between the horizontal reference plane γ defined by the tops of the two temple bodies 321 and the symmetry plane β of the connector 322 may be 70°-82°, such that the attachment surface 21 of the loudspeaker mechanism 20 may be closer to the back area of the auricle directly opposite to a position of the helix feet.

Specifically, when the loudspeaker mechanism 20 is at the first fixed position relative to the glasses temple body 321, the angle between the horizontal reference plane γ defined by the tops of the two temple bodies 321 and the symmetry plane β of the connector 322 may be any angle within the above range, such as 70°, 75°, 80°, 82°, etc., which may not be specifically limited herein.

In some embodiments, when the loudspeaker mechanism 20 is at the first fixed position relative to the glasses temple body 321, an angle between the symmetry plane λ of the glasses frame 31 and the symmetry plane β of the connector 322 may be 5°-30°.

Figure 27:
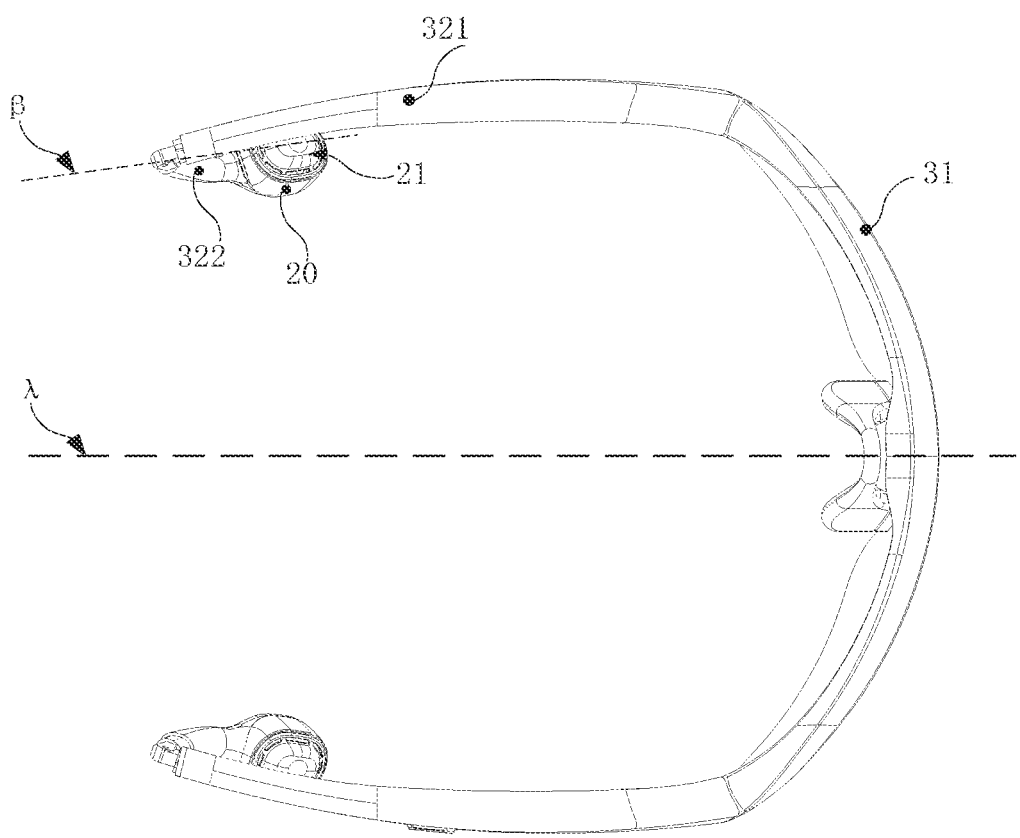
FIG. 27 is a schematic diagram illustrating a λ plane of a loudspeaker according to some embodiments of the present disclosure.

As shown in FIG. 27, the symmetry plane λ of the glasses frame 31 may refer to a symmetry plane that divides the glasses frame 31 symmetrically. The symmetry plane β of the connector 322 may be the same as that shown in FIG. 25, which is not repeated herein.

In some embodiments, the angle between the symmetry plane Δ of the glasses frame 31 and the symmetry plane β of the connector 322 may be related to the user's head shape. For example, the angle between the symmetry plane Δ of the glasses frame 31 and the symmetry plane β of the connector 322 corresponding to European and American population and Asian population may be different. When the user wears the glasses, in order to fix the loudspeaker mechanism 20 in a suitable position, the user's ears may support a bottom surface of the glasses temple body 321 and the side surface of the glasses temple body 321 needs to abut against the side of the user's head. Therefore, if the angle is large, a front part of the glasses temple body 321 abuts against the head and a rear part of the glasses temple body 321 may be away from the head. If the angle is large, the front part of the glasses temple body 321 may be away from the head and the rear part of the glasses temple body 321 may abut against the head. In both cases, the glasses temple body 321 may not make good contact with the head, which may easily cause the attachment surface 21 of the loudspeaker mechanism 20 to separate from the back of the auricle, thereby reducing the sound quality of the loudspeaker mechanism 20 and making it inconvenient to the usage of the user.

In some embodiments, when the loudspeaker mechanism 20 is at the first fixed position relative to the glasses temple body 321, the angle between the symmetry plane Δ of the glasses frame 31 and the symmetry plane β of the connector 322 may be 10°-25°. In some embodiments, the angle may also be 10°, 15°, 20°, 25°, etc., which may not be limited herein.

Figure 28:
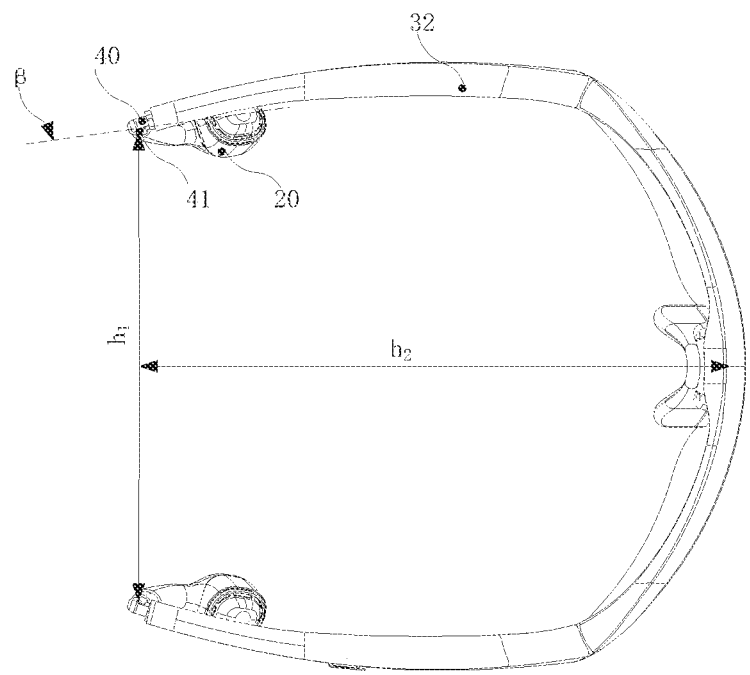
FIG. 28 is a schematic diagram illustrating a distance between related units of a loudspeaker according to some embodiments of the present disclosure.

Please refer to FIG. 28, a distance $h_1$ between the center points of the shafts 41 of the hinges 40 correspondings to the two glasses temples 32 may be 90-150 millimeters. This distance $h_1$ may correspond to a left and right width of the user's head.

It should be easy to understand that when the user wears the glasses, the two glasses temples 32 may be placed on an upper part of the user's ears and clamped on both sides of the head. If the distance $h_1$ between the center points of the shafts 41 of the hinge 40 correspondings to two glasses temples 32 is large, a clamping force of the glasses temples 32 toward the user's head may be relatively small and a situation of "not tightly clamped" may occur. As a result, the glasses may be easily loosen from the user's head and the loudspeaker mechanism 20 may deviate from the position corresponding to the back of the auricle. If the distance $h_1$ is small, the glasses temples 32 may clamp the user's head too much, which may cause discomfort to the user.

In some embodiments, the distance $h_1$ between the center points of the shafts 41 of the hinges 40 correspondings to the two glasses temples 32 may be 100-130 mm. In some embodiments, the distance $h_1$ may also be 100 mm, 110 mm, 120 mm, 130 mm, etc. It should be noted that different users have different head shapes, which may choose a headset with a more appropriate range of distance $h_1$. For example, the distance $h_1$ for male glasses may be in a range of 115-130 millimeters and the distance $h_1$ for female glasses may be in a range of 100-115 millimeters. Certainly, the distance $h_1$ may also be set to a middle value of the two ranges to suit both male and female at the same time.

Figure 30:
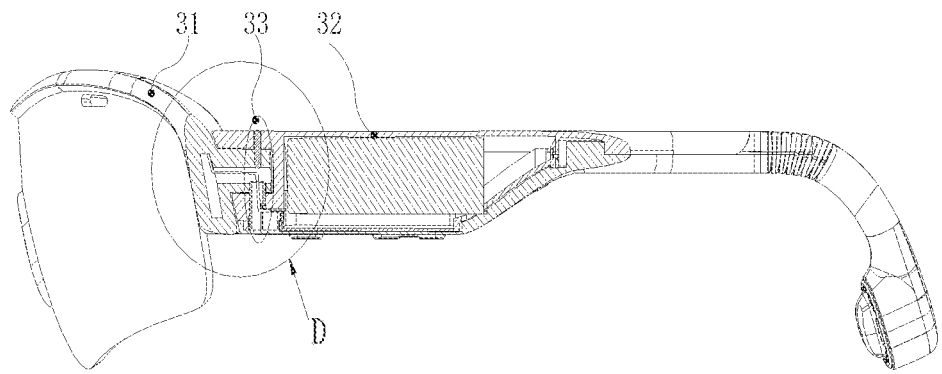
FIG. 30 is a sectional view illustrating a partial structure of a loudspeaker according to some embodiments of the present disclosure.

Please refer to FIG. 30, in some embodiments, a vertical distance $h_2$ of a line connecting the symmetric center point of the glasses frame 31 and the center point of the shafts 41 of the two hinges 40 may be 105-170 millimeters.

It should be noted that the symmetric center point of the glasses frame 31 may be a midpoint of the nose bridge in the middle of the glasses frame 31. The vertical distance $h_2$ may correspond to a front and back length of the user's head.

It may be easy to understand that if the vertical distance $h_2$ is large, when the user wears the glasses and the attachment surface 21 of the loudspeaker mechanism 20 is attached to the back of the auricle, the glasses frame 31 may be far away from the user's eyes, which may cause the user's eyes to be very uncomfortable. When the glasses frame 31 of the earphone is worn properly, the attachment surface 21 of the loudspeaker mechanism 20 may not attach properly on the back of the auricle due to it is far away from the back of the auricle. If the distance $h_2$ is small, when the glasses and earphone are used at the same time, the glasses frame 31 and the loudspeaker mechanism 20 clamp the head too tightly at the same time, which causes discomfort to the user. When the distance $h_2$ is too small, it is even difficult to use the glasses and earphone at the same time.

The vertical distance $h_2$ of the line connecting the symmetric center point of the glasses frame 31 with the center point of the shafts 41 of the two hinges 40 may also be 130-150 millimeters. Specifically, the vertical distance $h_2$ may be 130 millimeters, 140 millimeters, 150 millimeters, etc. It should be noted that different user groups may correspond to different distance ranges. For example, the vertical distance $h_2$ for the male glasses may be 140-160 mm, and the vertical distance $h_2$ for the female glasses may be 105-135 mm. Certainly, the vertical distance $h_2$ may be set to a median value of the two ranges to adapt to suit both male and female at the same time.

Please refer to FIG. 12 and FIG. 28, a ratio $h_3/h_2$ of a distance $h_3$ between the center point of the shaft 41 of each hinge 40 and the center point O of the attachment surface 21 of the corresponding loudspeaker mechanism 20 and the vertical distance $h_2$ of the line connecting the symmetric center point of the glasses frame 31 with the center points of the shafts 41 of the two hinges 40 may be 0.1-1.5.

The distance $h_3$ from the center point of the shaft 41 of each hinge 40 to the center point O of the attachment surface 21 of the corresponding loudspeaker mechanism 20 may correspond to a distance between the center point of the shaft 41 of the hinge 40 and an attachment position of the attachment surface 21 and the back of the user's auricle. The vertical distance $h_2$ between the symmetric center point of the glasses frame 31 and the center point of the shafts 41 of the two hinges 40 may correspond to the vertical distance from the front of the user's head to the back of the ear. When the vertical distance from the front of the user's head to the back of the ear is constant, if the distance between the center point of the shaft 41 of the hinge 40 and the attachment position of the attachment surface 21 and the back of the user's auricle is relatively large, that is, the above ratio is relatively large, which indicates that the distance between the center point of the shaft 41 of the hinge 40 and the center point O of the attachment surface 21 of the loudspeaker mechanism 20 is relatively large, the loudspeaker mechanism 20 may be easier to attach to the lower part of the back of the auricle. When the above ratio is small, which indicates that the distance between the center point of the shaft 41 of the hinge 40 and the center point O of the attachment surface 21 of the loudspeaker mechanism 20 may be relatively small, the loudspeaker mechanism 20 may be easier to attach to the upper part of the back of the auricle. Therefore, the sound/vibration transmission efficiency of the loudspeaker mechanism 20 may be affected, and the sound quality may be further affected.

In some embodiments, $h_3/h_2$ may also be in a range of 0.125-0.35, such as 0.125, 0.15, 0.20, 0.25, 0.30, 0.35, etc. Different ratios may be designed according to the different needs of users, which may not be limited herein.

Further, loudspeakers of different specifications may be set according to the above parameters, such that the user may choose according to his/her own head shape to satisfy the usage requirements of the user.

Figure 29:
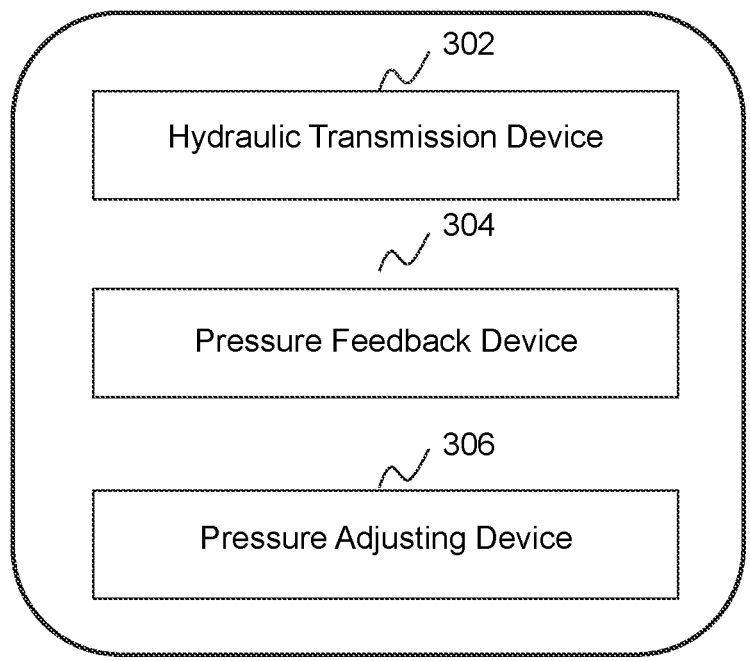
FIG. 29 is a block diagram illustrating a structure of a connector according to some embodiments of the present disclosure.

FIG. 29 is a block diagram illustrating a structure of a connector according to some embodiments of the present disclosure. As shown in FIG. 29, in some embodiments, the connector 322 may include a hydraulic transmission device 302. The external force provided by the hydraulic transmission device 302 may switch the loudspeaker mechanism 20 between the first fixed position and the second fixed position.

In some embodiments, the hydraulic transmission device 302 may include a hydraulic cylinder, hydraulic oil, a telescopic rod, and a return spring. When the loudspeaker mechanism 20 is switched from the first fixed position to the second fixed position, the hydraulic oil may drive into the hydraulic cylinder to push the telescopic rod to extend out and drive the hinge arm to rotate. As a result, the third supporting surface of the hinge base may be switched from abutting against the first supporting surface to abutting against the second supporting surface. Therefore, the loudspeaker mechanism 20 may be at the second fixed position to attach the back of the user's auricle. When the loudspeaker mechanism 20 is switched from the second fixed position to the first fixed position, the hydraulic oil may be driven out of the hydraulic cylinder and the return spring may pull the telescopic rod to reset to drive the hinge arm. As a result, the third supporting surface of the hinge base may be switched from abutting against the second supporting surface to abutting against the first supporting surface. Therefore, the loudspeaker mechanism 20 may be in the first fixed position.

In some embodiments, the hydraulic transmission device 302 may assist the user to switch the fixed position of the loudspeaker mechanism 20.

Specifically, in an application scenario, the hydraulic transmission device 302 may include a sensor. When the user switches the fixed position of the loudspeaker mechanism 20, it may need to pull the loudspeaker mechanism 20. The sensor may sense the force exerted by the user on the loudspeaker mechanism 20, and then determine whether the exerted force is greater than a threshold. If the force exerted by the user on the loudspeaker mechanism 20 is greater than the threshold (e.g., 1 N, 2 N, 3 N, etc.) set by the sensor, the sensor may determine that the user may need to switch the fixed position of the loudspeaker mechanism 20 at this time. Further, the sensor may control the hydraulic transmission device 302 to switch the fixed position of the loudspeaker mechanism 20. In such cases, the fixed position of the loudspeaker mechanism 20 may be switched without the user exerting a large force. The setting of the threshold may prevent the fixed position of the loudspeaker mechanism 20 from changing due to other external forces (such as accidental touching or squeezing, etc.).

In some embodiments, the hydraulic transmission device 302 may also automatically complete the switching of the fixed position of the loudspeaker mechanism 20 without the user's manual position switching. For example, a driving component controlled by the user (e.g., a control button) may be added. The user may control the hydraulic transmission device 302 by himself through the driving component to switch the fixed position of the loudspeaker mechanism 20 without the user pulling the connector 322 or the loudspeaker mechanism 20, thereby, improving the user experience. In some embodiments, the driving component controlled by the user may be connected to the hydraulic transmission device 302 and may control the hydraulic transmission device 302. The type of the driving component may be determined according to actual conditions.

Specifically, in an application scenario, the hydraulic transmission device 302 may include a hydraulic push rod. The hydraulic push rod may be arranged on the connector 322 and connected with the hydraulic transmission device 302. When the user needs to switch the loudspeaker mechanism 20 between the first fixed position and the second fixed position, the user may press the hydraulic push rod. The hydraulic push rod may control the hydraulic oil in the hydraulic transmission device 302 to enter the hydraulic cylinder or flow out of the hydraulic cylinder, such that the switching between the first fixed position and the second fixed position may be realized. Further, the connector 322 may be provided with an accommodating hole for holding the hydraulic pushing rod. When the hydraulic push rod is in a normal state, at least a part of the hydraulic push rod may protrude from the accommodating hole. When the user presses the hydraulic push rod, the hydraulic pushing rod may be pressed into the accommodating hole and control the hydraulic transmission device 302 connected to the hydraulic pushing rod to switch the fixed position of the loudspeaker mechanism 20.

In another application scenario, the hydraulic transmission device 302 may include a button. The button may be arranged on the connector 322 and connected with the hydraulic transmission device 302. When the user needs to switch the loudspeaker mechanism 20 between the first fixed position and the second fixed position, the user may press the button to control the flow of hydraulic oil in the hydraulic transmission device 302 connected to the button to realize the position switching function. Alternatively, the button may be a virtual button. The virtual button may be a specific program on a control device (e.g, a mobile phone) that is wirelessly connected to the loudspeaker. When the user touches the virtual button, the control device may send a specific instruction to the loudspeaker to control the operation of the hydraulic transmission device 302 on the loudspeaker.

Further, a working mode of the hydraulic transmission device 302 may be determined according to specific conditions. For example, when the hydraulic transmission device 302 assists the user to switch the fixed position of the loudspeaker mechanism 20, a side of the hinge arm opposite to the second supporting surface may be disposed with the hydraulic push rod connected to the hydraulic transmission device 302. A telescopic rod in the hydraulic transmission device 304 may be arranged on the same side of the hinge arm as the second supporting surface. When the user switches the fixed position of the loudspeaker mechanism 20, the hinge arm may be rotated, which drives the hydraulic push rod to move to the hydraulic cylinder or move away from the hydraulic cylinder, such that the hydraulic oil may be pushed into or out of the hydraulic cylinder and the telescopic rod may be extended or reset to assist the rotation of an auxiliary hinge arm. As another example, the user may drive the hydraulic rotating device 302 through the control component to automatically complete the position switch. The hydraulic push rod may be connected to the control component, for example, the hydraulic push rod may be connected to a control button or the hydraulic push rod may directly serve as the control component. The user may press the hydraulic push rod to push the hydraulic oil into the hydraulic cylinder, or release the hydraulic push rod to make the hydraulic oil flow out of the hydraulic cylinder. For a further example, if the hydraulic push rod is driven by an electric signal, an electromagnetic drive device may be arranged in the hydraulic push rod. The electromagnetic drive device may be connected to a control circuit of the loudspeaker through a wire. The hydraulic push rod may be driven to move by receiving instructions from the user.

In some embodiments, the hydraulic transmission device 302 may make the loudspeaker mechanism 20 attach to the human body with a certain pressure when the loudspeaker mechanism 20 is in the second fixed position. For example, after the hydraulic transmission device 302 drives the connector 322 to switch to the second fixed position, the hydraulic transmission device 302 may control the extension or retraction length of the telescopic rod by controlling an oil pressure in the hydraulic cylinder, thereby controlling the pressure of the loudspeaker mechanism 20 on the human body and ensuring that the loudspeaker mechanism may attach on a predetermined position of the human body. As a result, the pressure may be controlled so that the human body is pressed for a long time without discomfort. The pressure provided by the hydraulic transmission device 302 may be similar to the pressure provided when the hinge 40 is used in the above embodiments, which is not repeated herein.

In some embodiments, the connector 322 may further include a pressure feedback device 304 for obtaining pressure. In some embodiments, the pressure feedback device 304 may include a scanner and a pressure detection device (such as a pressure sensor). When the user wears the glasses, the scanner may scan a head structure of the user and obtain data related to the pressure applied to the head structure of the user (such as a distance between the two ears of the user, a space between front and back sides of the head of the user, etc.). When the scanner obtains the data, the scanner may transmit the data to other components. Alternatively, when the user wears glasses, the pressure sensor may also measure and obtain an attaching pressure of the attachment surface 21 and transmit the attaching pressure to other components to adjust the attaching pressure between the attachment surface of the loudspeaker mechanism 20 and the back of the auricle.

In some embodiments, the connector 322 may further include a pressure adjusting device 306 for adjusting a contact pressure between the loudspeaker mechanism 20 and the human body according to the pressure obtained by the pressure feedback device 304.

In some embodiments, the pressure adjusting device 306 may have a structure (e.g., a flow valve) that changes the pressure of the loudspeaker mechanism 20.

In an application scenario, after scanning and obtaining the head structure data of the user and analyzing the pressure applied to the head structure of the user, the information may be transmitted to the pressure adjusting device 306. After receiving the attaching pressure between the attachment surface 21 of the loudspeaker mechanism 20 and the back of the auricle that is obtained from the pressure sensor, the pressure feedback device 304 may transmit the attaching pressure to the pressure adjusting device 306. After receiving the information, the pressure adjusting device 306 may adjust the attaching pressure according to the pressure, thereby improving the user's wearing experience. For example, when the attaching pressure is greater than a predetermined pressure, the pressure adjusting device 306 may reduce a flow rate of the flow valve to reduce the attaching pressure. When the attaching pressure is less than the predetermined pressure, the pressure adjusting device 306 may increase the flow rate of the flow valve to increase the attaching pressure, thereby preventing the loudspeaker from separating from the user's head during wearing.

The loudspeaker may also have wires for transmitting electrical signals. In some embodiments, the wires of the loudspeaker may be hidden inside the fixing mechanism, the connector, and the loudspeaker mechanism. For example, the fixing mechanism may include a first connection wire and the connector may include a second connection wire. There may have internal wires inside the loudspeaker mechanism. A control circuit and a battery may be arranged in the glasses temples. The first connection wire and the second connection wire may be connected to the control circuit or the battery, respectively. The second connection wire may be connected to the internal wires in the loudspeaker mechanism. In some embodiments, a rotating shaft of the fixing mechanism, such as the connection between the glasses frame and the temple, may be provided with a through-hole that is convenient for the wiring of the first connection wire at the shaft.

Figure 31:
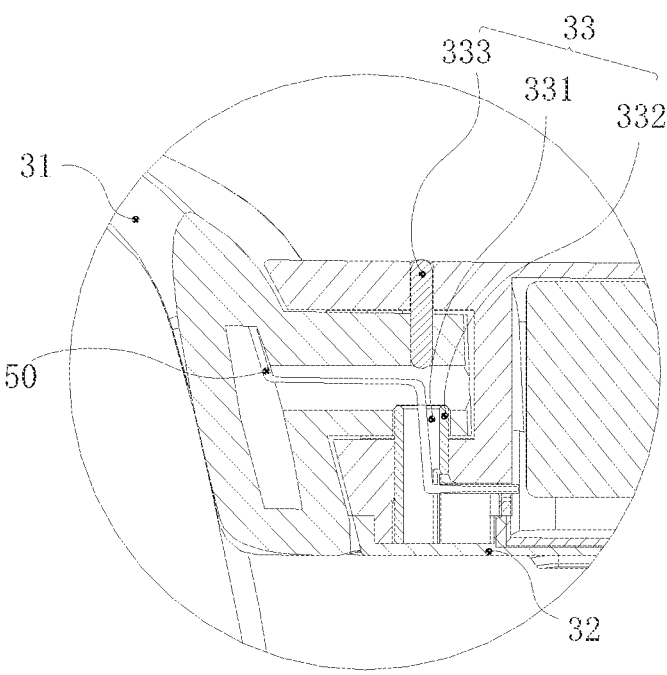
FIG. 31 is an enlarged view illustrating a structure of a part D in FIG. 30.

FIG. 30 is a sectional view illustrating a partial structure of a loudspeaker according to some embodiments of the present disclosure. FIG. 31 is an enlarged view illustrating a structure of a part D in FIG. 30. As shown in FIGS. 31-30, in some embodiments, the loudspeaker may further include a first connection wire 50. The glasses frame 30 may further include a rotating shaft 33.

In some embodiments, the first connection wire 50 may be a connection wire that functions as a mechanical connection or an electrical connection. In the embodiments, the two glasses temples 112 may be provided with functional components, respectively, and need to be electrically connected through the first connection wire 50 to achieve a specific function. In some embodiments, a count of the rotating shaft 33 may be two, and respectively used to connect the glasses frame 31 and the two glasses temples 32, so that the glasses frame 31 and the glasses temples 32 may rotate relative to the rotating shaft 33, respectively. The rotating shaft 33 may be disposed with a rotating shaft wiring channel 331 along an axial direction of the rotating shaft 33. The first connection wire 50 may pass through the rotating shaft wiring channel 331 and extend to the glasses frame 31 and the glasses temples 32, respectively.

In some embodiments, after the first connection wire 50 passes through the rotating shaft wiring channel 331, one end of the first connection wire 50 may directly extend to one of the glasses temples 32, and other end of the first connection wire 50 may enter into the glasses frame 31 and further extend to another one of the glasses temples 32 along a first mounting groove 111, thereby electrically connecting the two functional components 16 located inside the two glasses temples 32, respectively.

It may be easy to understand that relative positions of structures near the rotating shaft 33 may change when the glasses frame 31 and a glasses temple 32 are folded. At this time, if the first connection wire 50 located at the connection between the glasses frame 31 and the glasses temple 32 is directly arranged around the periphery of the rotating shaft 33, the first connection wire 50 herein may be compressed or pulled, even deformed or broken with the folding of the glasses frame 31 or the glasses temple 32. Therefore, the stability of the first connection wire 50 may be affected and the service life of the first connection wire 50 may be shortened.

In some embodiments, the rotating shaft 33 may be disposed with the rotating shaft wiring channel 331 along an axial direction. The first connection wire 50 located at the connection of the glasses frame 31 and the glasses temple 32 may pass through the rotating shaft wiring channel 331. Therefore, when the glasses frame 31 and the glasses temple 32 are folded, the first connection wire 50 located inside the rotating shaft wiring channel 331 may only rotate to a certain amount with the rotation of the rotating shaft 33 to reduce the folding, compressing, or pulling of the first connection wire 50, thereby protecting the first connection wire 50 to a certain extent, improving the stability of the first connection wire 50, and extending the service life of the first connection wire 50.

In some embodiments, an inner diameter of the rotating shaft wiring channel 331 may be larger than an outer diameter of the first connection wire 50. For example, the inner diameter of the rotating shaft wiring channel 331 may be twice the outer diameter of the first connection wire 50. Accordingly, a binding effect of the inner sidewall of the rotating shaft wiring channel 331 on the first connection wire 50 may be reduced, thereby reducing the rotation amplitude of the first connection wire 50 when the glasses frame 31 and the glasses temple 32 are folded.

Figure 32:
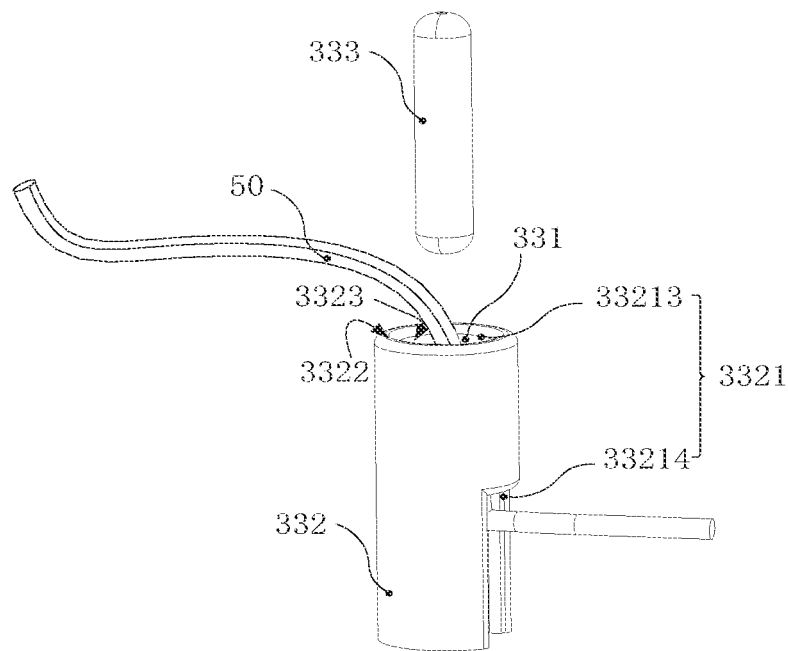
FIG. 32 is a schematic diagram illustrating a structure of a rotating shaft and a connection wire according to some embodiments of the present disclosure.

Please further refer to FIG. 31 and FIG. 32. FIG. 32 is a schematic diagram illustrating a structure of a rotating shaft and a connection wire according to some embodiments of the present disclosure. As shown in FIG. 32, in some embodiments, the rotating shaft 33 may include a first rotating shaft 332. Two ends of the first rotating shaft 332 may be respectively connected to the glasses frame 31 and the glasses temple 32. The rotating shaft wiring channel 331 may be arranged along an axial direction of the first rotating shaft 332. The rotating shaft wiring channel 331 may communicate with the outside through a wiring port 3321 arranged on at least one end surface of the first rotating shaft 332. The first connection wire 50 may extend to the glasses frame 31 or the glasses temple 32 through the wiring port 3321.

It should be noted that, in the embodiments, the first rotating shaft 332 may be rotatably connected to one of the glasses frame 31 and the glasses temple 32, and fixedly connected to another, so that the glasses frame 31 and the glasses temple 32 may be rotatably connected around the first rotating shaft 332.

In some embodiments, the rotating shaft wiring channel 331 may be arranged inside the first rotating shaft 332 and further communicate with the outside through the wiring port 3321.

Specifically, the rotating shaft wiring channel 331 may penetrate at least one end surface of the first rotating shaft 332 to form the wiring port 3321 of the rotating shaft wiring channel 331. Therefore, the first connection wire 50 may extend from the rotating shaft wiring channel 331 through the at least one end surface of the first rotating shaft 332, and then extend to the glasses frame 31 or the glasses temple 32. It may be easy to understand that the periphery of the end surface of the first rotating shaft 332 may have a relatively large movement space. The first connection wire 50 extending from the end surface of the first rotating shaft 332 may be accommodated in the movement space. If the first rotating shaft 332 at the end surface is rotatably connected to the corresponding glasses frame 31 or the glasses temple 32, when the glasses frame 31 and the glasses temple 32 are folded and rotated, and the first connection wire 50 near the wire opening 3321 on the end surface is twisted to a certain degree when with the rotation of the first rotating shaft 332. The twisting may be appropriately buffered by the movement space, and the first connection wire 50 may stop twisting and start to move, thereby further reducing the twisting degree of the first connection wire 50 and improving the stability of the first connection wire 50.

Figure 33:
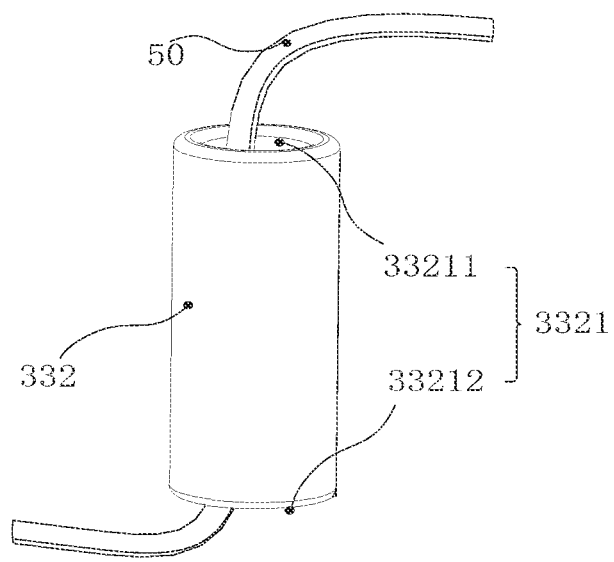
FIG. 33 is a schematic diagram illustrating a structure of a first rotating shaft according to some embodiments of the present disclosure.

FIG. 33 is a schematic diagram illustrating a structure of a first rotating shaft according to some embodiments of the present disclosure. As shown in FIG. 33, in some embodiments, the wiring port 3321 may include a first wiring port 33211 and a second wiring port 33212 respectively arranged on two ends of the first rotating shaft 332. The rotating shaft wiring channel 331 may be communicate with the outside through two wiring ports 3321, respectively, so that the first connection wire 50 may pass through the two ends of the first rotating shaft 332 and extend to the glasses frame 31 and the glasses temple 32 through the first wiring port 33211 and the second wiring port 33212, respectively.

In an application scenario, the first connection wire 50 at the connection between the glasses frame 31 and the glasses temple 32 may be disposed inside the rotating shaft wiring channel 331 in the first rotating shaft 332, and extend from the rotating shaft wiring channel 331 through the two ends of the first rotating shaft 332, respectively. At this time, since large movement space exist on the periphery of two end surfaces of the first rotating shaft 332, the first connection wire 50 extending from the two ends surfaces of the first rotating shaft 332 may only move or twist slightly without deformation due to squeezing and pulling when the relative rotation occurs between the glasses frame 31 and the glasses temple 32.

Please further refer to FIG. 32. In some embodiments, the wiring port 3321 may include a first wiring port 33213 and a second wiring port 33214. The first wiring port 33213 may be arranged on an end surface of the first rotating shaft 332, and the second wiring port 33214 may be arranged on a sidewall of the first rotating shaft 332. Therefore, one end of the rotating shaft wiring channel 331 may penetrate the end surface of the first rotating shaft 332 in an axial direction through the first wiring port 33213, and the other end may penetrate through the sidewall of the first rotating shaft 332 through the second wiring port 33214, and then communicate with the outside. The first connection line 50 may extend to the glasses frame 31 and the glasses temple 32 through the first wiring port 33213 and the second wiring port 33214, respectively.

Similarly, a large movement space may be arranged near the end surface of the first rotating shaft 332 where the first wiring port 33213. When a relative movement occurs between the glasses frame 31 and the glasses temple 32, the first connection wire 50 near the first wiring port 33213 may only undergo a relative shift or a small twist.

In an application scenario, the first rotating shaft 332 may be fixedly connected to one of the glasses frame 31 and the glasses temple 32 arranged near the second wiring port 33214 and rotatably connected to another of the glasses frame 31 and the glasses temple 32 arranged near the first wiring port 33213. That is, the first rotating shaft 332 may be rotatably connected to one of the glasses frame 31 or the glasses temple 32 at the wiring port 3321 arranged on the end surface. The first rotating shaft 332 may be fixedly connected with another of the glasses frame 31 or the glasses temple 32 at the wiring port 3321 arranged on the sidewall.

In another application scenario, the first rotating shaft 332 may be close to the glasses frame 31 at the first wiring port 33213 and rotatably connected to the glasses frame 31. The first rotating shaft 332 may be close to the glasses temple 32 at the second wiring port 33214 and fixedly connected to the glasses temple 32.

In some embodiments, the first rotating shaft 332 is rotatably connected to the glasses frame 31, and the relative rotation between the glasses frame 31 and the glasses temple 32 may cause the relative movement of the first connection wire 50 at the first wiring port 33213. However, since the first wiring port 33213 is arranged on the end surface of the first rotating shaft 332, similar to the above embodiments, the end surface of the first rotating shaft 332 may have a large movement space. When the glasses frame 31 and the glasses temple 32 are folded and rotated, and the first connection wire 50 near the wire opening 3321 on the end surface is twisted to a certain degree along with the rotation of the first rotating shaft 332. The twisting may be appropriately buffered by the movement space, and the first connection wire 50 may stop twisting and start to move, thereby further reducing the twisting degree of the connection wire and improving the stability of the connection wire.

In addition, the first rotating shaft 332 may be fixedly connected to the glasses temple 32 at the second wiring port 33214. It may be easy to understand that the temple 32 and the first rotating shaft 332 may maintain synchronization when the relative rotation between the glasses frame 31 and the glasses temple 32 occurs. Therefore, the first connection wire 50 in the rotating shaft wiring channel 331 may extend into the first connection wire 50 of the temple 32 through the second wiring port 33214 without twisting, compressing, or pulling. Therefore, at this time, the second wiring port 33214 may be arranged on the end surface of the first rotating shaft 332 or the sidewall of the first rotating shaft 332. The relative rotation between the glasses frame 31 and the glasses temple 32 may not cause the twisting, compressing, pulling, etc. to the first connection wire 50 herein.

In other embodiments, if the first rotating shaft 332 and the glasses temple 32 are rotatably connected at the second wiring port 33214, the relative rotation between thereof may allow the first connection wire 50 to move, which may be constrained by the sidewall of the first rotating shaft 332 at the second wiring port 33214, so that the first connection wire 50 may be compressed between the sidewall of the first rotating shaft 332 and the glasses temple 32.

If the first rotating shaft 332 is near the glasses temple 32 at the first wiring port 33213 and rotatably connected to the glasses temple 32, the first rotating shaft 332 may be near the glasses frame 31 at the second wiring port 33214 and fixedly connected to the glasses frame 31. For the same reason, when the glasses frame 31 and the glasses temple 32 are folded, the first connection wire 50 inside the rotating shaft wiring channel 331 and near the first wiring port 33213 and the second wiring port 33214 may be still only slightly twisted or moved.

Please refer to FIG. 32. In some embodiments, the rotating shaft 33 may further include a second rotating shaft 333 coaxial with and spaced apart from the first rotating shaft 332.

In the embodiments, the second rotating shaft 333 may be arranged on a side of the first rotating shaft 332 near the first wiring port 33213. Certainly, in other embodiments, the second rotating shaft 333 may also be arranged on a side of the first rotating shaft 332 closed to the second wiring port 33214.

Figure 34:
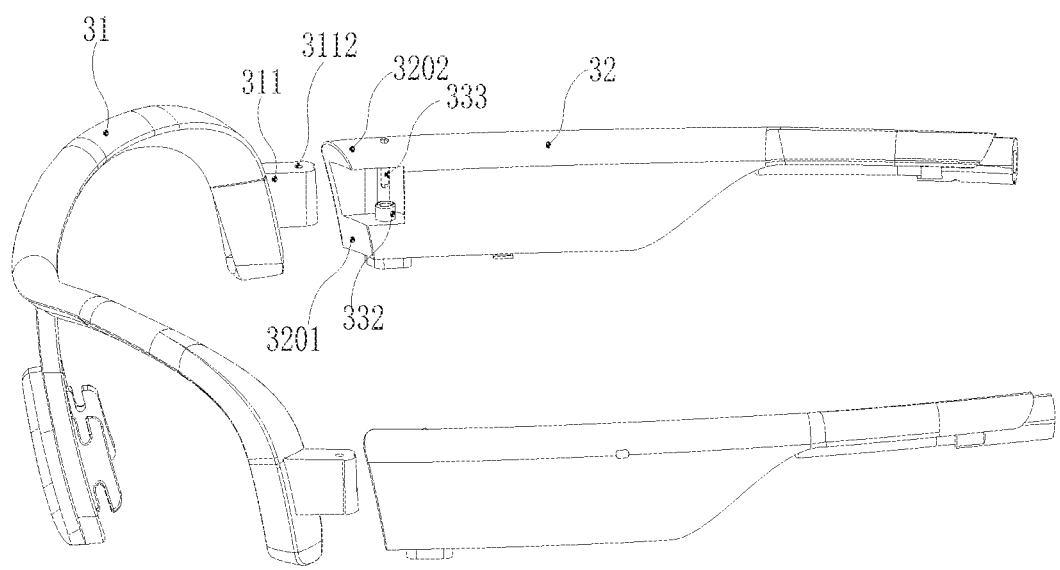
FIG. 34 is an exploded view of a partial structure of a loudspeaker according to some embodiments of the present disclosure.

Please refer to FIG. 34. FIG. 34 is an exploded view of a partial structure of a loudspeaker according to some embodiments of the present disclosure. In some embodiments, the glasses frame 31 may include first lug(s) 311. Specifically, a count of the first lug(s) 311 may be two that may be respectively arranged at two ends of the glasses frame 31 connecting the two glasses temples 32 and respectively protrude toward the corresponding glasses temples 32.

In some embodiments, the glasses temple 32 may include a second lug 3201 and a third lug 3202 arranged at intervals. The second lug 3201 and the third lug 3202 may both face an end of the glasses frame 31 and be connected to the glasses temple 32 at which the lugs are located. When the user wears the glasses, the second lug 3201 and the third lug 3202 may be connected on a side away from the user's head, thereby making the glasses more overall and more beautiful in appearance. In an application scenario, the second lug 3201 and the third lug 3202 arranged at intervals may be formed by disposing a groove in the middle of an end of the glasses temple 32 facing the glasses frame 31.

Further, ends of the first rotating shaft 332 and the second rotating shaft 333 closed to each other may be both connected to the first lug 311. Ends of the first rotating shaft 332 and the second rotating shaft 333 away from each other may be connected to the second lug 3201 and the third lug 3202, respectively, ao as to maintain the first lug 311 between the second lug 3201 and the third lug 3202.

Please refer to FIG. 33, in some embodiments, the first wiring port 33213 may be arranged on an end surface of the first rotating shaft 332 near the second rotating shaft 333. The second wiring port 33214 may be arranged on a sidewall of the first rotating shaft 332 near the second lug 3201. The first rotating shaft 332 may be rotatably connected with the first lug 311 and fixedly connected with the second lug 3201.

Specifically, one end of the first connection wire 50 inside the rotating shaft wiring channel 331 may extend from the first wiring port 33213 and pass through an interval between the first rotating shaft 332 and the second rotating shaft 333. Further, in an application scenario, the first lug 311 may be disposed with a wiring channel communicating with the first wiring port 33213, so that the first connection wire 50 may further enter the glasses frame 31 through the first lug 311.

In addition, the other end of the first connection wire 50 inside the rotating shaft wiring channel 331 may extend from the second wiring port 33214. Further, in an application scenario, the third lug 3202 may be disposed with a wiring channel communicating with the second wiring port 33214, so that the first connection wire 50 may further enter the glasses temple 32 through the wiring channel of the third lug 3202.

In some embodiments, the second wiring port 33214 may be a through-hole arranged on a sidewall of the first rotating shaft 332 and communicates with the rotating shaft wiring channel 331 with penetrating an end of the first rotating shaft 332. In the embodiments, the second wiring port 33214 may further penetrate along the sidewall of the first rotating shaft 332 to an end of the first rotating shaft 332 away from the first wiring port 33213. It may be easy to understand that, in the embodiments, the second wiring port 33214 may have a larger space. Therefore, when the first connection wire 50 is moved due to some reasons, the restriction on the first connection wire 50 may be further reduced, and the damage caused by a blocking of the sidewall of the first rotating shaft 332 may be further reduced.

Figure 35:
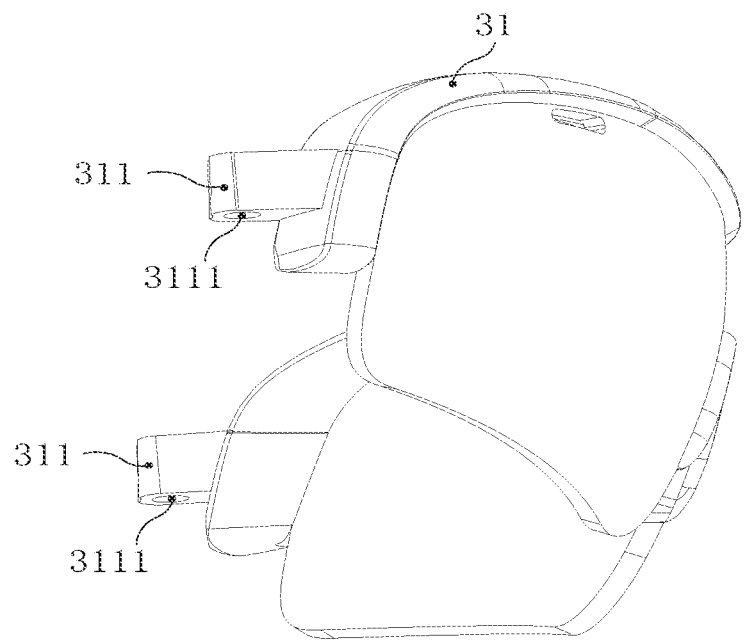
FIG. 35 is a schematic diagram illustrating structures of a glasses frame and glasses lens according to some embodiments of the present disclosure.
Figure 36:
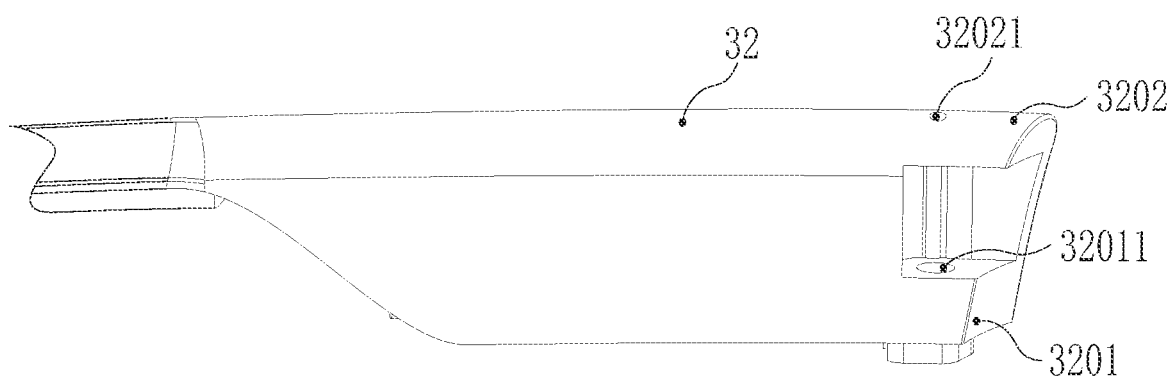
FIG. 36 is a schematic diagram illustrating a partial structure of a glasses temple according to some embodiments of the present disclosure.

Please refer to FIG. 34, FIG. 35, and FIG. 36. FIG. 35 is a schematic diagram illustrating structures of a glasses frame and glasses lens according to some embodiments of the present disclosure. FIG. 36 is a schematic diagram illustrating a partial structure of a glasses temple according to some embodiments of the present disclosure. In some embodiments, the first lug 311 and the second lug 3201 may be coaxially disposed with a first accommodating hole 3111 and a second accommodating hole 32011, respectively. Sizes of the first accommodating hole 3111 and the second accommodating hole 32011 may be set to allow the first rotating shaft 332 to be inserted into the first accommodating hole 3111 from the outside of the glasses temple 32 through the second accommodating hole 32011, such that the first rotating shaft 332 may be in an interference attach with the second accommodating hole 32011 and in a clearance attach with the first accommodating hole 3111.

In some embodiments, the second accommodating hole 32011 may be a through-hole penetrating the second lug 3201. The first accommodating hole 3111 may correspond to the second accommodating hole 32011 and penetrate at least a part of the first lug 311. An inner diameter of the first accommodating hole 3111 may be larger than that of the second accommodating hole 32011. An outer diameter of the first rotating shaft 3111 may be between the first accommodating hole 3111 and the second accommodating hole 32011. Therefore, the first rotating shaft 332 may be fixedly connected to the glasses temple 32 and rotatably connected with the glasses frame 31, so that the glasses frame 31 and the glasses temple 32 may be rotated around the first rotating shaft 332 to be folded or unfolded.

Further, in some embodiments, the first lug 311 and the third lug 3202 may be coaxially disposed with a third accommodating hole 3112 and a fourth accommodating hole 32021, respectively. Sizes of the third accommodating hole 3112 and the fourth accommodating hole 32021 may be set to allow the second rotating shaft 333 to be inserted into the third accommodating hole 3112 from the outside of the glasses temple 32 through the fourth accommodating hole 32021, such that the second rotating shaft 333 may be in an interference attach with the third accommodating hole 3112 and in a clearance attach with the fourth accommodating hole 32021, or the second rotating shaft 333 may be in a clearance attach with the third accommodating hole 3112 and in an interference attach with the fourth accommodating hole 32021.

In the embodiments, the third accommodating hole 3112 and the fourth accommodating hole 32021 may be coaxially arranged with the first accommodating hole 3111 and the second accommodating hole 32011. The third accommodating hole 3112 may penetrate at least a part of the first lug 311. In an application scenario, the first accommodating hole 3111 and the third accommodating hole 3112 may be coaxially penetrated. Specifically, as described in the above embodiments, the first lug 311 of the glasses frame 31 may be disposed with a wiring channel communicating with the first wiring port 33213. The first accommodating hole 3111 and the third accommodating hole 3112 may be respectively arranged on both sides of the wiring channel arranged inside the first lug 311 and both penetrate the wiring channel. The fourth accommodating hole 32021 may penetrate the third lug 3202. The outer diameter of the second rotating shaft 333 may be between the inner diameters of the third accommodating hole 3112 and the fourth accommodating hole 32021. The inner diameter of the third accommodating hole 3112 may be larger than that of the fourth accommodating hole 32021. Alternatively, the inner diameter of the fourth accommodating hole 32021 may be larger than that of the third accommodating hole 3112. Therefore, the second rotating shaft 333 may be fixedly connected to the glasses temple 32 and rotatably connected to the glasses frame 31, or the second rotating shaft 333 may be fixedly connected to the glasses frame 31 and rotatably connected to the glasses temple 32, so that the glasses frame 31 and the glasses temple 32 may be rotated around the first rotating shaft 332 to be folded or unfolded.

In some embodiments, the second rotating shaft 333 may be a solid shaft with a diameter less than that of the first rotating shaft 332. In the wearing state, the second rotating shaft 333 may be located on the upper side of the glasses temple 32, and the first rotating shaft 332 may be located on the lower side of the glasses temple 32.

It should be noted that, since the rotating shaft wiring channel 331 may be arranged inside the first rotating shaft 332, the outer diameter of the first rotating shaft 332 may be larger, which may adversely satisfy the user's aesthetic requirements. Therefore, in the embodiments, the second rotating shaft 333 with a smaller outer diameter may be further arranged. When the user wears glasses, the second rotating shaft 333 may be arranged on an upper portion that is easily found, and the first rotating shaft 332 may be arranged on a lower portion which is not easily observed. Since the outer diameter of the second rotating shaft 333 is smaller, the overall aesthetic effect of the glasses may be improved to a certain extent.

In other embodiments, the first rotating shaft 332 and the second rotating shaft 333 may also be in other cases. For example, the second rotating shaft 333 may also be a hollow shaft, and the diameter of the second rotating shaft 333 may be larger than the diameter of the first rotating shaft 332. Alternatively, in the wearing state, the second rotating shaft 333 may be arranged on a lower side of the glasses temple 32, and the first rotating shaft 332 may be arranged on an upper side of the glasses temple 32, etc., which may not be limited herein.

Please refer to FIG. 34, a connection between an end surface 3322 of the first rotating shaft 332 for disposing the first wiring port 33213 and an inner wall surface 3323 of the first rotating shaft 332 for defining the rotating shaft wiring channel 331 may be arc-shaped. It may be easy to understand that, when the rotation between the glasses frame 31 and the glasses temple 32 though the rotating shaft 33 occurs, since the first rotating shaft 332 and the glasses frame 31 are rotatably connected, the first connection wire 50 at the first wiring port 33213 may be moved. In the embodiments, the connection between the end surface 3322 of the first rotating shaft 332 and the inner wall surface 3323 may be arc-shaped. Therefore, when the first connection wire 50 at the first wiring port 33213 moves and contacts with the first rotating shaft 332, the first connection wire 50 may be avoided to be cut if the connection is too sharp, thereby further protecting the first connection wire 50.

In an application scenario, the connection between the end surface of the first rotating shaft 332 for disposing the second wiring port 33214 and the inner wall surface 3323 of the first rotating shaft 332 for defining the rotating shaft wiring channel 331 may also be arc-shaped. Therefore, in this way, the first connection wire 50 may be further protected.

In some embodiments, there is a second connection wire in the connector. Refer to FIG. 16, a second connection wire 60 may be arranged on the outside of the hinge 40.

A control circuit, etc. related to the loudspeaker mechanism 20 may be arranged in the glasses temple body 321. In such cases, the second connection wire 60 may be required to electrically connect the loudspeaker mechanism 20 and the control circuit in the glasses temple body 321. Specifically, the second connection wire 60 may be arranged on one side of the hinge base 42 and the hinge arm 43 and arranged in the same accommodating space as the hinge 40. Further, the hinge base 42 may include a first end surface 422, and the hinge arm 43 may include a second end surface 431 arranged opposite to the first end surface 422. It may be easy to understand that there may be a certain gap between the first end surface 422 and the second end surface 431, so that the hinge base 42 and the hinge arm 43 may relatively rotate about the shaft 41. In the embodiments, during the relative rotation of the hinge arm 43 and the hinge base 42, a relative position between the first end surface 422 and the second end surface 431 may also change accordingly, thereby making the gap between the two become larger or smaller.

In some embodiments, the gap between the first end surface 422 and the second end surface 431 may always be kept larger or smaller than a diameter of the second connection wire 60. Therefore, the second connection wire 60 arranged outside the hinge 40 may not be caught in the gap between the first end surface 422 and the second end surface 431 during the relative rotation of the hinge base 42 and the hinge arm 43, which may reduce damage to the second connection wire 60 by the hinge. Specifically, a ratio of the gap between the first end surface 422 and the second end surface 431 to a diameter of the second connection wire 60 during the relative rotation of the hinge arm 43 and the hinge base 42 may always be kept greater than 1.5 or less than 0.8. For example, the ratio may be greater than 1.5, 1.7, 1.9, 2.0, etc., or less than 0.8, 0.6, 0.4, 0.2, etc., which may not be specifically limited herein.

In some embodiments, the second connection wire 60 may be further extended and connected to the internal wires of the loudspeaker mechanism to realize the input and output of electrical signals.

The above descriptions of the loudspeaker structure may be only specific examples and should not be regarded as the only feasible implementation. Obviously, for persons having ordinary skills in the art, after understanding the basic principles of the loudspeaker, various modifications and changes in form and detail to the specific methods and steps of implementing the loudspeaker may be made without departing from the principles, and these modifications and changes may be still within the scope described above. For example, the loudspeaker may include a housing, a connector 322, or the like. The connector 322 may connect the loudspeaker component 40 and the housing.

Having thus described the basic concepts, it may be rather apparent to those skilled in the art after reading this detailed disclosure that the foregoing detailed disclosure is intended to be presented by way of example only and is not limiting. Various alterations, improvements, and modifications may occur and are intended for those skilled in the art, though not expressly stated herein. These alterations, improvements, and modifications are intended to be suggested by this disclosure, and are within the spirit and scope of the exemplary embodiments of this disclosure.

Moreover, certain terminology has been used to describe embodiments of the present disclosure. For example, the terms "one embodiment," "an embodiment," and/or "some embodiments" mean that a particular feature, structure or characteristic described in connection with the embodiment is included in at least one embodiment of the present disclosure. Therefore, it is emphasized and should be appreciated that two or more references to "an embodiment" or "one embodiment" or "an alternative embodiment" in various portions of this specification are not necessarily all referring to the same embodiment. Furthermore, the particular features, structures or characteristics may be combined as suitable in one or more embodiments of the present disclosure.

Further, it will be appreciated by one skilled in the art, aspects of the present disclosure may be illustrated and described herein in any of a number of patentable classes or context including any new and useful process, machine, manufacture, or composition of matter, or any new and useful improvement thereof. Accordingly, all aspects of the present disclosure may be performed entirely by hardware, may be performed entirely by software (including firmware, resident software, microcode, etc.), or may be performed by a combination of hardware and software. The above hardware or software can be referred to as "data block", "module", "engine", "unit", "component" or "system". Furthermore, aspects of the present disclosure may take the form of a computer program product embodied in one or more computer-readable media having computer-readable program code embodied thereon.

Furthermore, the recited order of processing elements or sequences, or the use of numbers, letters, or other designations therefore, is not intended to limit the claimed processes and methods to any order except as may be specified in the claims. Although the above disclosure discusses through various examples what is currently considered to be a variety of useful embodiments of the disclosure, it is to be understood that such detail is solely for that purpose, and that the appended claims are not limited to the disclosed embodiments, but, on the contrary, are intended to cover modifications and equivalent arrangements that are within the spirit and scope of the disclosed embodiments. For example, although the implementation of various components described above may be embodied in a hardware device, it may also be implemented as a software-only solution, e.g., an installation on an existing server or mobile device.

Similarly, it should be appreciated that in the foregoing description of embodiments of the present disclosure, various features are sometimes grouped together in a single embodiment, figure, or description thereof for the purpose of streamlining the disclosure aiding in the understanding of one or more of the various embodiments. However, this disclosure method does not mean that the present disclosure object requires more features than the features mentioned in the claims. Rather, claimed subject matter may lie in less than all features of a single foregoing disclosed embodiment.

In some embodiments, numbers describing the number of components and attributes are used. Accordingly, in some embodiments, the numerical data used in the description and claims are approximate values, and the approximate values may change according to the required characteristics of individual embodiments. In some embodiments, the numerical data should consider the prescribed effective digits and adopt the method of general digit retention. Although the numerical ranges and data used to confirm the breadth of the range in some embodiments of the present disclosure are approximate values, in specific embodiments, the setting of such values is as accurate as possible within the feasible range.

In closing, it is to be understood that the embodiments of the application disclosed herein are illustrative of the principles of the embodiments of the application. Other modifications that may be employed may be within the scope of the application. Thus, by way of example, but not of limitation, alternative configurations of the embodiments of the application may be utilized in accordance with the teachings herein. Accordingly, embodiments of the present application are not limited to that precisely as shown and described.

What is claimed is:

1. A loudspeaker, comprising:
a loudspeaker mechanism configured to generate a vibration signal and transmit the vibration signal to a human body;
a fixing mechanism configured to support and hold a position of the loudspeaker mechanism; and
a connector configured to connect the loudspeaker mechanism with the fixing mechanism, wherein:
the loudspeaker mechanism includes a first fixed position and a second fixed position, the first fixed position being a fixed position of the loudspeaker when the loudspeaker is in a non-working state, the second fixed position being a fixed position of the loudspeaker when the loudspeaker is in a working state, and
the connector is configured to switch the loudspeaker mechanism between the first fixed position and the second fixed position.

2. The loudspeaker of claim 1, wherein:
the loudspeaker mechanism includes an attachment surface in contact with the human body, and
when the loudspeaker mechanism is in the second fixed position, the loudspeaker mechanism presses the attachment surface against a predetermined area on back of an auricle to transmit the vibration signal to the human body.

3. The loudspeaker of claim 2, wherein:
the connector includes a hinge configured to realize the switching of the loudspeaker mechanism between the first fixed position and the second fixed position,
the hinge includes a hinge base and a hinge arm, the hinge arm being rotatably connected with the hinge base, and
the hinge arm at least includes a first supporting surface and a second supporting surface and the hinge base includes a third supporting surface, the first supporting surface and the second supporting surface respectively abutting against the third supporting surface to realize the switching of the loudspeaker mechanism between the first fixed position and the second fixed position.

4. The loudspeaker of claim 3, wherein the connector is an elastic structure and provides a pressure to press the attachment surface against the back of the auricle when the loudspeaker mechanism is in the second fixed position.

5. The loudspeaker of claim 2, wherein the connector includes a hydraulic transmission device, an external force being provided by the hydraulic transmission device to switch the loudspeaker mechanism between the first fixed position and the second fixed position.

6. The loudspeaker of claim 5, wherein the hydraulic transmission device provides a pressure when the loudspeaker mechanism is in the second fixed position.

7. The loudspeaker of claim 6, wherein:
the connector includes a pressure feedback device configured to obtain the pressure, and
the connector includes a pressure adjusting device configured to adjust a contact pressure between the loudspeaker mechanism and the human body according to the pressure obtained by the pressure feedback device.

8. The loudspeaker of claim 1, wherein the fixing mechanism includes at least one of a glasses frame, a hat, a headwear, a hearing aid, or other headwear products.

9. The loudspeaker of claim 1, wherein the loudspeaker mechanism includes:
a magnetic circuit component configured to provide a magnetic field;
a vibration component configured to convert an electrical signal input to the vibration component into the vibration signal, at least a part of the vibration component being arranged in the magnetic field; and
a housing configured to accommodate the magnetic circuit component and the vibration component.

10. The loudspeaker of claim 9, wherein the vibration component at least includes a first vibration transmission component and a second vibration transmission component, the first vibration transmission component being arranged above the second vibration transmission component, the first vibration transmission component and the second vibration transmission component forming a composite vibration structure stacked up and down to generate at least two resonance peaks.

11. The loudspeaker of claim 10, wherein:
the first vibration transmission component has a certain elasticity relative to the second vibration transmission component, and
a thickness of the first vibration transmission component is smaller than a thickness of the second vibration transmission component.

12. The loudspeaker of claim 10, wherein:
the first vibration transmission component includes a first circular ring and at least two first supporting rods converging toward a center of the first circular ring, and
the second vibration transmission component includes a second circular ring and at least two second supporting rods converging toward a center of the second circular ring.

13. The loudspeaker of claim 12, wherein the at least two first supporting rods and the at least two second supporting rods are staggered.

14. The loudspeaker of claim 12, wherein: a thickness of the first vibration transmission component is 0.1 mm-0.2 mm, a width of a first supporting rod is 0.5 mm-1.0 mm, and a thickness of the second vibration transmission component is 0.8 mm-1.2 mm, a width of a second supporting rod is 1.6 mm-2.6 mm.

15. The loudspeaker of claim 12, wherein the first vibration transmission component is made of stainless steel material.

16. The loudspeaker of claim 10, wherein:
a coil is fixed under the second vibration transmission component, at least a part of the coil being arranged in a magnetic circuit system, and
the coil receives the electrical signal and converts the electrical signal into the vibration signal.

17. The loudspeaker of claim 9, wherein:
the first vibration transmission component is connected with the housing and transmits the vibration signal to the housing,
an outer surface of the housing includes an attachment surface, the attachment surface being an outer surface of the loudspeaker mechanism in contact with the human body, and
when the loudspeaker mechanism is in the second fixed position, the loudspeaker mechanism presses the attachment surface against a predetermined area on back of an auricle to transmit the vibration signal to the human body.

18. The loudspeaker of claim 1, wherein the fixing mechanism includes a first connection wire and the connector includes a second connection wire, the first connection wire and the second connection wire being connected to a control circuit or a battery, respectively.

19. The loudspeaker of claim 1, wherein the fixing mechanism includes a rotating shaft, the rotating shaft being configured to connect a glasses frame and glasses temples of a pair of glasses, wherein the glasses frame and the glasses temples are configured to rotate around the rotating shaft.

20. The loudspeaker of claim 19, wherein the rotating shaft includes a rotating shaft wiring channel along an axis of the rotating shaft, a first connection wire of the fixing mechanism passing through the rotating shaft wiring channel, and both ends of the first connection wire extending into the glasses frame and the glasses temples, respectively.

\* \* \* \* \*